US010579783B1

(12) United States Patent
Aument et al.

(10) Patent No.: US 10,579,783 B1
(45) Date of Patent: Mar. 3, 2020

(54) IDENTITY AUTHENTICATION VERIFICATION

(71) Applicant: Square, Inc., San Francisco, CA (US)

(72) Inventors: Todd Aument, San Francisco, CA (US); Christopher Rohlf, Lincroft, NJ (US)

(73) Assignee: Square, Inc., San Francisco, CA (US)

( * ) Notice: Subject to any disclaimer, the term of this patent is extended or adjusted under 35 U.S.C. 154(b) by 130 days.

(21) Appl. No.: 15/665,288

(22) Filed: Jul. 31, 2017

(51) Int. Cl.
*G06F 21/32* (2013.01)
*G06K 9/00* (2006.01)
*H04L 29/06* (2006.01)

(52) U.S. Cl.
CPC ......... *G06F 21/32* (2013.01); *G06K 9/00288* (2013.01); *H04L 63/0861* (2013.01); *G06K 9/00892* (2013.01)

(58) Field of Classification Search
CPC .......... G06K 9/00221; G06K 9/00335; G06K 9/00288; G06K 9/00892; H04M 1/667; G06F 21/32; H04L 63/086
See application file for complete search history.

(56) References Cited

U.S. PATENT DOCUMENTS

| | | | | |
|---|---|---|---|---|
| 8,542,879 | B1 * | 9/2013 | Nechyba | G06K 9/00228 382/103 |
| 8,724,856 | B1 * | 5/2014 | King | G06K 9/00288 382/115 |
| 9,405,967 | B2 * | 8/2016 | Samet | G06K 9/00288 |
| 9,853,972 | B2 * | 12/2017 | Kukreja | G06F 21/33 |
| 9,942,238 | B2 * | 4/2018 | Votaw | H04L 63/102 |
| 2004/0042634 | A1 * | 3/2004 | Cazier | G06T 1/0021 382/100 |
| 2011/0115893 | A1 * | 5/2011 | Hayashi | H04N 7/181 348/77 |
| 2013/0093897 | A1 * | 4/2013 | Fan | H04N 7/181 348/159 |
| 2015/0086088 | A1 * | 3/2015 | King | G06K 9/00906 382/118 |
| 2015/0206010 | A1 * | 7/2015 | Ueno | G06K 9/00671 345/633 |
| 2015/0294100 | A1 * | 10/2015 | King | G07D 7/202 726/19 |
| 2016/0188958 | A1 * | 6/2016 | Martin | G06K 9/00228 382/118 |
| 2017/0039869 | A1 * | 2/2017 | Gleim | G09B 5/12 |
| 2017/0308741 | A1 * | 10/2017 | Gleim | G06K 9/00295 |
| 2017/0374280 | A1 * | 12/2017 | Chan | H04N 5/23222 |
| 2018/0035085 | A1 * | 2/2018 | Siminoff | H04N 5/2252 |
| 2018/0096212 | A1 * | 4/2018 | Lin | G06F 16/5838 |
| 2018/0121639 | A1 * | 5/2018 | Liu | G06K 9/00597 |
| 2018/0150708 | A1 * | 5/2018 | Martin | G06K 9/00906 |
| 2018/0302414 | A1 * | 10/2018 | Wagner | G06Q 20/3224 |
| 2019/0130171 | A1 * | 5/2019 | Alameh | G06K 9/00288 |

* cited by examiner

Primary Examiner — Bobbak Safaipour
(74) Attorney, Agent, or Firm — Lee & Hayes, P.C.

(57) ABSTRACT

Systems and methods for identity authentication verification are disclosed. First image data corresponding to a first image is submitted in response to a request to authenticate the identity of a user of a device. A second image is captured shortly after the first image is captured. The first and second image data and/or metadata associated with the first and second image are compared and analyzed to determine if the first image is an authentic image captured by a camera of the device and if the person depicted in the first image is the user of the device.

18 Claims, 9 Drawing Sheets

IDENTITY AUTHENTICATION VERIFICATION

BACKGROUND

Requests to perform electronic transactions can be candidates for fraud. A shrewd person may steal or otherwise access a device without authorization and attempt to perform a transaction using the device. Such a transaction may include a money transfer, for example. To prevent or minimize such fraud, identity verification may be used. Described herein are improvements in technology that will help, among other things, to verify the integrity and source of an image used to authorize a transaction.

BRIEF DESCRIPTION OF THE DRAWINGS

The above and other features of the present disclosure, its nature and various advantages, will be more apparent upon consideration of the following detailed description, taken in conjunction with the accompanying drawings in which.

Figure 1:
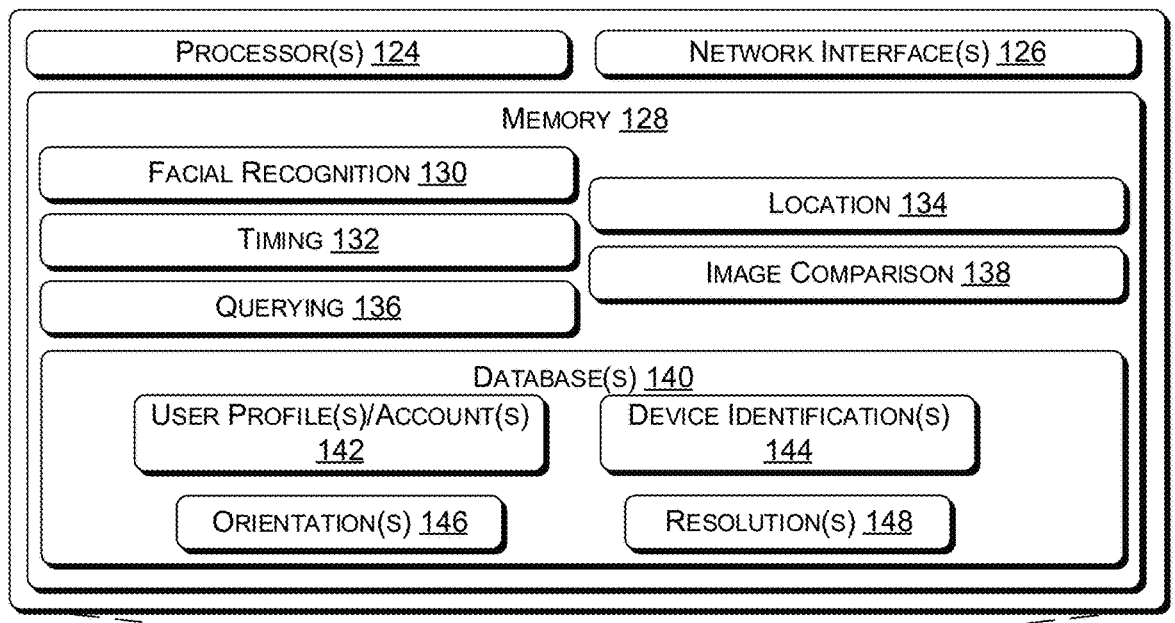
FIG. 1 depicts an example environment for identity authentication verification.
Figure 1:
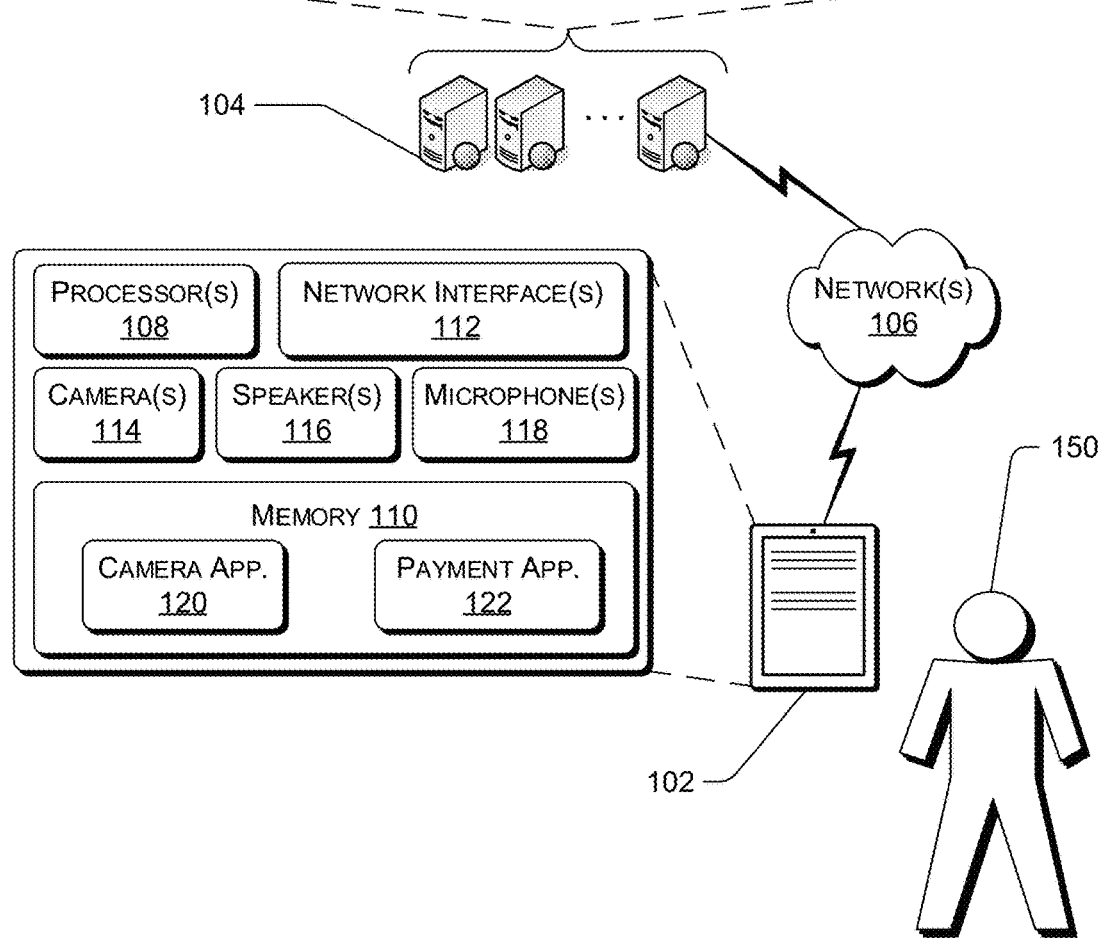

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The techniques and systems described herein are directed to verifying the source and integrity of a photo submitted for identity authentication, such as during a transaction using a mobile device. Take, for example, a mobile device application that allows a user of the mobile device on which the application is installed and/or accessed from to conduct mobile transactions, such as transferring money. Generally, the user of the mobile device associated with the application is authorized to use the mobile device. This authorization may be based on, for example, a touch identification and/or passcode that, when entered, allows the user to access the functionality of the device. However, in certain instances, an unauthorized user may access the device. The unauthorized access may be from the device being jailbroken and/or rooted, for example. In both authorized and unauthorized use examples, it may be beneficial to require the user of the device to verifying his or her identity before performing the transaction.

Verifying user identity may be performed utilizing an image depicting the user. Facial recognition techniques, as described more fully below, may be performed on image data corresponding to the image to determine if facial features of the user of the mobile device match or substantially match facial features of an authorized user of the device and/or the application. While facial recognition may adequately verify the identity of the device user in many situations, additional verification may be required or desired. For example, an unauthorized user of the device may submit a previously-taken photograph of an authorized user, such as from the camera roll of the device and/or by taking a picture of a physical photograph of the authorized user. In these situations, facial recognition may not be enough to adequately verify that the user of the device is in fact an authorized user of the device and/or application.

To improve identity authorization verification, one or more of the following techniques may be utilized. One technique may include requesting that the user of the device take a photograph for identity verification. When the user captures an image via a camera of the device, the technique may include causing the camera to capture another image shortly before and/or after the first image is captured. In examples, upon downloading and/or accessing an application by which the request to perform the action is submitted from, the user of the device may consent to images being captured in the manner described herein. If the user does not consent to such images being captured, other identity authentication verification techniques, as described herein, may be utilized. The image data corresponding to the first image and the second image may be compared to determine if the images are similar. If the images are exactly the same, or if the first image is substantially different from the second image, it may be determined that the device is being used in an unauthorized manner. To the contrary, if the images are substantially similar, it may be determined that the device is being used in an authorized manner.

Additionally, or alternatively, metadata associated with the first image and/or the second image may be used to improve identity authorization verification. For example, time information may be associated with the first image and the second image. The time information may indicate a time, such as a time of day and/or a day of the year, that the first image was captured. Time information may also be associated with the second image. In an authorized user situation, the time information associated with the first image will indicate that the first image was captured shortly before or shortly after the second image. In an unauthorized user situation, the time information associated with the first image will indicate that the first image was captured more than a threshold amount of time before or after the second image was captured. This unauthorized user situation may occur when the first image was provided from a camera roll or other image storage and not taken in response to the request for the photograph.

Additionally, or alternatively, location information may be associated with the first image and the second image. The location information may indicate a location, such as a global positioning location, that the first image was captured at. Location information may also be associated with the second image. In an authorized user situation, the location information associated with the first image will indicate that the first image was captured at or near the location of the second image. In an unauthorized user situation, the location information will indicate that the first image was captured at a different location than the second image. In examples, the determination that the first image was captured at a different location than the second image may be based at least in part on a distance between the two locations being at least a threshold distance. The threshold distance may be static or dynamic. For example, the threshold distance may be set to at least 10 feet, at least 25 feet, at least 50 feet, at least 100 feet, at least 300 feet, at least 0.25 miles, at least 0.5 miles, or at least 1 mile. Additional, or alternative metrics may be used and/or other considerations may be utilized, such as whether the images were captured in different buildings, different cities, different counties, different states and/or territories, and/or different countries. Additionally, or alternatively, the location information may be used in conjunction with the time information and results of facial recognition techniques to determine that two images depicting the same person have been submitted at or near the same time but at different locations.

The identity authorization verification techniques described herein may additionally, or alternatively, include determining that an object depicted in the first image is also depicted in the second image, but in a different location or position. This determination may indicate that the object is in motion, which may indicate that the first image was taken by the user of the device in response to the request for a photograph. The techniques may additionally, or alternatively, include determining that the device from which the first and second image data were received from is in electronic communication with another device and that the two devices are associated with the same profile and/or account. By way of example, the device may be a mobile phone and the second device may be, for example, a vehicle, television, voice-assistant device, speaker, headset, etc. If the device and the other device are in electronic communication with each other, such as via Bluetooth pairing, it may be determined that the user depicted in the first image is the user of the device.

Additionally, or alternatively, the techniques may include comparing facial recognition results as between the first image and the second image. For example, one or more facial features may be compared as between a user depicted in the first image and a user depicted in the second image. These facial features may include, for example, facial hair, hair color, skin color, eye color, eye position, nose position, mouth position, scars, and/or other facial features. All or some of these features should be the same or substantially similar as between the first image and the second image if the first image is an authentic photograph of the user of the device at the time of the request. Disparities in any or all of these features may indicate that the photograph is not authentic.

Additionally, or alternatively, the techniques may include analyzing data related to the device from which the image data is received. For example, depending on the type of the device, one or more device orientations may be associated with reference orientations for taking a photograph. An example of a reference orientation for a mobile phone may be that the phone is facing screen up. Additionally, or alternatively, the device data may include a device identification. The first image and the second image may be associated with metadata that indicates the device identification number of the device on which the images were captured. In an authorized user situation, the device identification number associated with the first image will match the device identification number for the second image. In an unauthorized user situation, the device identification number associated with the first image may not match the device identification number for the second image. Additionally, or alternatively, the device information may include a status of the flash and/or the use of the flash feature of the device. Additionally, or alternatively, the device information may include an indication of which camera of the device captured the first image and/or the second image. For example, the device may have two cameras, with one camera disposed on a side of the device with a screen or user interface and the other camera disposed on the opposing side, such as when the device is a mobile phone. Generally, when a user of the device takes an authentic photograph of him or herself, the camera disposed on the side of the device with the screen is used, which allows the user to see him or herself while the photograph is being taken. To the contrary, when the user of the device is taking a photograph of another person or a picture of a person, the camera on the opposing side of the device is used, again to allow the user of the device to see the other person/picture that he or she is capturing an image of. The device information may include an indication of the camera that captured the first and/or the second images, and this information may be utilized to determine if the first image is an authentic image of the user of the device.

Additionally, or alternatively, the techniques may include a depth-of-field analysis of the first image data and/or the second image data. For example, depths of various facial features and/or objects to the camera of the device may be determined. In an authorized user situation, the various facial features and/or objects will have varying depths to the camera. However, in some unauthorized user situations, such as when the first image is a picture of an already-taken photograph, the depth information will be the same or substantially the same. This information may be utilized to determine that the first image is not an authentic photograph of the user of the device.

Additionally, or alternatively, the techniques may include comparing image resolutions of the first image and the second image, and/or comparing an image resolution of the first image with a reference resolution associated with the camera from which the first image data was received. For example, in an authorized user situation, the first image and the second image will be captured by the same camera, and that camera will be associated with the device that the corresponding image data is received from. If the resolution of the first image is the same or substantially the same as the resolution of the second image, then this information may be utilized to determine that the first image is an authentic photograph of the user of the device. Additionally, or alternatively, if the resolution of the first image matches or substantially matches a reference resolution associated with the device from which the first image data was received from, it may be determined that the first image is an authentic photograph of the user of the device. To the contrary, if the resolution associated with the first image differs from the resolution associated with the second image, and/or if the resolution associated with the first image differs from a reference resolution associated with the device, then it may be determined that the first image is not an authentic photograph of the user of the device.

Additionally, or alternatively, the techniques may include requesting the device user to perform an action and analyzing the response to determine if the first image is an authentic photograph of the user of the device. For example, if identity authentication as described herein is not verified, or if the verification is not above a threshold level of confidence, a request may be sent to the device. The request may ask the user of the device to perform an action, such as, for example, performing a physical act and photographing the act. By way of example, the request may ask the user to stick out his or her tongue, hold up two fingers, open his or her mouth, raise his or her eyebrows, etc., and take a photograph of the user performing the act. The facial recognition techniques described herein may be utilized to determine if the image data associated with the photograph shows a person performing the act. This information may be utilized to determine that the image data corresponds to an authentic or unauthentic photograph of the user of the device.

Additionally, or alternatively, the techniques for identity authentication verification may include determining that the device from which the request was received has been jailbroken and/or rooted. For example, when software and/or firmware restrictions are removed from a device, the device may be jailbroken. Jailbreaking may allow the downloading and installation of applications, extensions, and other functionality that was not intended by the device manufacturer. This may provide root access to the device, such as control over the device subsystems. One or more techniques may be utilized to detect when a device has been jailbroken and/or rooted, and if detected, the request to perform the action may be rejected.

The techniques described herein affect computer operations in various ways. For example, a remote system and/or an application may cause the camera of a device to automatically capture one or more images and to convert those images to image data. Metadata associated with those images may be generated and sent to a remote system, in some instances automatically. The result of the identity authentication verification techniques described herein may be utilized to effectuate a request of the user, such as the transfer of monetary funds or the performance of other acts that result in a physical change to the device, the remote system, or another object.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

The terms "component" or "module" refer broadly to software stored on non-transitory storage medium (e.g., volatile or non-volatile memory for a computing device), hardware, or firmware (or any combination thereof) modules. Components and/or modules are typically functional such that they that may generate useful data or other output using specified input(s). A component and/or module may or may not be self-contained. An application program (also called an "application") may include one or more components and/or modules, or a component and/or module may include one or more application programs.

The preceding introduction is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 depicts an example environment 100 for identity authentication verification. Environment 100 may include a device 102, which may communicate with a remote system 104 via a network 106.

The device 102 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile (e.g., navigation system), an appliance, a camera, a robot, a hologram system, a security system, a home-based computer system (e.g., intercom system, home media system, etc.), a projector, an automated teller machine (ATM), and so on. In some instances, the device 102 may be a merchant device.

In some examples, the device 102 may include one or more processing units 108, memory 110, and one or more network interfaces 112. In examples, the processing unit(s) 108 may execute one or more modules and/or processes to cause the device 102 to perform a variety of functions, as set forth above and explained in further detail in the following disclosure. In some examples, the processing unit(s) 108 may include a central processing unit (CPU), a graphics processing unit (GPU), both CPU and GPU, or other processing units or components known in the art. Additionally, each of the processing unit(s) 108 may possess its own local memory, which also may store program modules, program data, and/or one or more operating systems. Depending on the exact configuration and type of the device 102, the memory 110, also described herein as computer-readable media, may include volatile memory (such as RAM), non-volatile memory (such as ROM, flash memory, miniature hard drive, memory card, or the like), or some combination thereof. The memory 110 (as well as all other types of memory or storage described herein) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer storage media does not include communication media, such as modulated data signals and carrier waves. As such, computer storage media is non-transitory media.

In various examples, the device 102 may include one or more input/output interface(s). Examples of input/output interface(s) may include one or more cameras 114, one or more speakers 116, one or more microphones 118, and other input/output devices not specifically shown in FIG. 1, such as, for example, a keyboard, a mouse, a pen, a touch input device, a display, etc. Furthermore, the device 102 may include one or more network interfaces 112 for interfacing with the network(s) 106, as described below. The network interfaces 112 may be any network interface hardware components that may allow the device 102 to communicate over the network(s) 106. The one or more networks 106 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 106 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network, the environment selected, or both. Consequently, one or more computing devices of the environment 100 may communicatively couple to the one or more networks 106 in any manner, such as by a wired or wireless connection.

In at least one example, the memory 110 may include one or more modules or instructions to enable the device 102 to determine whether background processes or modules are operating on the device 102. The one or more modules or instructions may be implemented as more processes or as fewer processes, and functions described for the processes may be redistributed depending on the details of the implementation. The terms "module" and "component" refer broadly to software stored on non-transitory storage medium (e.g., volatile or non-volatile memory for a computing device), hardware, or firmware (or any combination thereof) modules. Modules and components are typically functional such that they that may generate useful data or other output using specified input(s). A module and/or component may or may not be self-contained. An application program (also called an "application") may include one or more modules and/or components, or a module and/or a component may include one or more application programs. In some examples, a module and/or component may include an Application Program Interface (API) to perform some or all of its functionality (e.g., operations). In additional and/or alternative examples, the module(s) and/or component(s) may be implemented as computer-readable instructions, various data structures, and so forth via at least one processing unit (e.g., processing unit(s) 108) to configure the device 102 to execute instructions and to perform operations described herein.

In some examples, the memory 110 may include various components, including a camera application 120 and a payment application 122, for example. The camera application 120 may provide a user interface associated with capturing images by the one or more cameras 114. The camera application 120 may, when enabled, display one or more images viewed by the one or more cameras 114. The camera application 120 may include multiple functionalities, such as, providing a user 150 of the device 102 with the ability to captured one or more images and/or video, select between multiple cameras 114 associated with the device, save captured images, such as to a camera roll or other image storage located locally and/or remotely from the device 102, send image data corresponding to captured images to one or more other devices or systems, such as the remote system 104, and/or generate metadata associated with the captured images. The metadata may include, for example, time information corresponding to a time at which images are captured, location information corresponding to a location at which images are captured, camera identification data corresponding to a camera 114 that captured a given image, device identification data corresponding to the device 102, orientation data corresponding to an orientation of the device 102 when an image is captured, and/or resolution data corresponding to a resolution of a captured image.

The payment application 122 may include functionality that enables a user 150 of the device 102 to make a monetary transaction, such as, for example, the transfer of money between accounts, the withdrawal of money, the deposit of money, and/or other types of transactions. The payment application 122, while described herein as an application associated with the transfer of money, may include one or more additional or alternative functionalities where the user 150 of the device 102 requests that an action be performed. The actions may be any actions where identity authentication of the user 150 of the device 102 is required and/or desired. In a non-limiting example, the user 150 of the device 102 may utilize the payment application 122 to request that a sum of money be transferred from a first account to a second account. Upon making the request via the payment application 122, the user 150 may be queried to provide a photograph of the user 150 for identity authentication. The payment application 122 may access the functionality of the camera application 120 to capture an image of the user 150 of the device 102. The camera 114 may generate image data corresponding to the image, and that image data may be sent, via the network 106, to a remote system 104 for processing, as will be described more fully below.

The remote system 104 may include some of the same or similar components as the device 102. For example, the remote system 104 may include one or more processors 124 and one or more network interfaces 126. The processors 124 may include similar components as the processors 108 from the device 102. Additionally, or alternatively, the network interfaces 126 may include similar components as the network interfaces 112 from the device 102. The remote system 104 may also include memory 128. The memory 128 may include similar components as the memory 110 from the device 102. Additionally, or alternatively, the memory 128 may include one or more of a facial recognition component 130, a time component 132, a location component 134, a querying component 136, an image comparison component 138, and one or more databased 140. Example functionality of these components is described below.

The memory 128 may be configured to receive, via the network 106, image data and metadata associated with image data from the device 102 and/or one or more other devices. The components of the memory 128 may be configured to improve identity authentication verification as described herein. For example, the facial recognition component 130 may be configured to analyze image data, particularly data corresponding to a user 150 depicted in an image, to determine if facial characteristics of the depicted user 150 match or substantially match facial characteristics of an authorized user of the device 102 and/or an application, such as the payment application 122. The facial recognition component 130 may use one or more facial recognition techniques to perform this functionality.

By way of example, the facial recognition component 130 may receive image data corresponding to an image of a person, such as a person's face. The facial recognition component 130 may be configured to separate and/or focus on the portion of the image data corresponding to the face from other aspects and/or objects depicted in the image. The facial recognition component 130 may then analyze the image data corresponding to the face to determine one or more characteristics of the face. The one or more characteristics of the face may include any facial characteristics, but, in examples, the characteristics may include skin color, eye color, facial hair, hair color, lip color, facial feature spacing, nose shape, lip shape, lip size, ear shape, eye shape, scar presence, freckle presence, cheek bone position, head shape, eyebrow length, eyelash length, teeth color, teeth alignment, and/or dimple presence. The facial characteristics may be compared to reference characteristics associated with one or more authorized users of the device 102 and/or the application to determine if the user depicted in the image is an authorized user. The reference characteristics may be stored, such as in the one or more databases 140.

Additionally, or alternatively, the memory 128 may include a timing component 132. The timing component 132 may be configured to, among other things, receive timing data associated with image data. The timing data may indicate a time at which an image is captured. For example, a camera 114 of the device 102 may capture one or more images and generate corresponding image data and timing data. The image data and the timing data may be sent to the remote system 104 for processing. The timing data may be utilized in one or more ways to provide an indication that the user 150 of the device 102 is or is not an authorized user of the device 102 and/or the application. Using the example from above where the user 150 is queried to capture an image of him or herself for authentication purposes, in an authorized user scenario, the timing data associated with image will indicate that the image was captured at or near the time that the image data was received by the remote system 104. This information may indicate that the image was captured in response to the query and that the person depicted in the image is the user of the device. In other examples, such as when multiple images are received from the device 102, the timing data associated with the multiple images will indicate that the images were captured within a threshold amount of time from each other in an authorized user scenario. The threshold amount of time may be, for example, within a second, several seconds, or fractions of a second. In an unauthorized user scenario, the timing data may indicate that the received image was captured at a different time and/or not within a threshold amount of time from when the corresponding image data was received and/or from when a second image was captured by the camera 114. For example, in response to the query to provide an image of the user 150 of the device 102, an unauthorized user may provide an image of an authorized user that was previously taken. The unauthorized user may do this knowing that facial recognition may be performed to authorize the requested action. However, in this example, the timing data associated with the previously-taken image will differ, sometimes substantially, from when the image was received by the remote system 104 and/or from the timing data associated with a second image captured automatically in response to the first image being captured and/or sent to the remote system 104. In these and other examples, the timing component 132 may be utilized to improve identity authentication verification.

Additionally, or alternatively, the memory 128 may include a location component 134. The location component 134 may receive and utilize location data to verify identity authentication. For example, location data associated with an image or images may be received from the device 102. The location data may indicate a geographical location where an image was captured by the camera 114 of the device 102. This location data may be compared to location data associated with the device 102 itself. Additionally, or alternatively, as described herein, a second image may be captured in response to the first image being captured by the device 102 and/or in response to the first image data being sent by the device 102 and/or received by the remote system 104. Second location data associated with the second image may be compared to the first location data to determine whether the location where the first image was captured is the same or substantially the same as the location where the second image was captured. In an authorized user scenario, the first location data and second location data will be the same or substantially the same. To the contrary, in an unauthorized user scenario, the first location data may differ from the second location data. In examples, the determination that the first image was captured at a different location than the second image may be based at least in part on a distance between the two locations being at least a threshold distance. The threshold distance may be static or dynamic. For example, the threshold distance may be set to at least 10 feet, at least 25 feet, at least 50 feet, at least 100 feet, at least 300 feet, at least 0.25 miles, at least 0.5 miles, or at least 1 mile. Additional, or alternative metrics may be used and/or other considerations may be utilized, such as whether the images were captured in different buildings, different cities, different counties, different states and/or territories, and/or different countries. In these and other examples, the location component 134 may be utilized to improve identity authentication verification.

Additionally, or alternatively, the memory 128 may include a querying component 136. The querying component 136 may be configured to generate text data and/or audio data representing one or more queries to be sent to the device 102. The queries may represent requests for the user 150 of the device 102 to perform an action, the performance of which may be utilized for identity authentication verification. The action may include, for example, taking a photograph of the user 150 doing something specific, such as holding up a certain number of fingers, holding up certain fingers, smiling, raising his or her eyebrows, sticking out his or her tongue, taking the photograph from a certain angle, and/or performing a series of the example actions described above. The action may also include requesting that the user 150 answer a question, audibly and/or textually, and/or inputting a password and/or passcode. The actions described herein are for illustration purposes only and it should be understood that other actions may be utilized to verify identity authentication.

Additionally, or alternatively, the memory 128 may include an image comparison component 138. The image comparison component 138 may be utilized to compare image data for the purpose, for example, of verifying the identity of a person depicted in an image. Sticking with the examples provided above, a user 150 of the device 102 may request that the payment application 122 perform an action. Based at least in part on that request, the device 102 and/or the remote system 104 may request that the user 150 take a photograph of him or herself for the purpose of authenticating the user's identity as someone who is authorized to use the device 102, use the application 122, and/or request the action. In response to the request, the user 150 of the device 102 may submit an image, described herein as a first image. In response to the device 102 capturing the first image and/or sending first image data corresponding to the first image to the remote system 104, and/or in response to the remote system 104 receiving the first image data, the device 102 may capture a second image. The device 102 may capture the second image based at least in part on an instruction from the remote system 104. In examples, upon downloading and/or accessing an application by which the request to perform the action is submitted from, the user of the device may consent to images being captured in the manner described herein. If the user does not consent to such images being captured, other identity authentication verification techniques, as described herein, may be utilized.

The first image data and the second image data may be sent from the device 102 to the remote system 104 for processing. The first image data and the second image data may be compared for the purpose, for example, of verifying identity authentication. For example, one or more aspects of the first image may be compared to one or more aspects of the second image to determine if the images are (1) substantially similar, (2) exactly the same, or (3) substantially different. The one or more aspects may include the presence of one or more objects depicted in the images, characteristics of the one or more objects, lighting associated with the images, and/or facial features of a person depicted in the images. The three situations identified above are explained below in more detail.

In the first situation, the first image and the second image may be substantially similar. This situation may indicate that an authorized user is using the device 102. This is because, while many aspects of the two images should be the same, subtle differences as between the first image and the second image should be identified based on the first image being captured at a different time than the second image. These subtle differences may be a slight change in the position of one or more objects depicted in the images and/or a change to one or more facial features of the person depicted in the images. For example, a person capturing a photograph of him or herself may smile while capturing the photograph, but that person may cease smiling after the photograph is taken. In this example, the first image may depict the user smiling while the second image may depict the user not smiling. Differences such as these indicate that the first image is an authentic image of the user of the device at the time of the request to take a photograph.

In the second situation, the first image and the second image being exactly the same may indicate that an unauthorized user is using the device. For example, as described above in the first situation, subtle differences as between the first and second images should be identified based at least on the different timing associated with the capture of the first image and the second image. When the first image is exactly the same as the second image, this may indicate that the device 102 has been tampered with, such as in an attempt to perform unauthorized actions. For example, the device 102 may have been programmed to send a previously-taken image of an authorized user as the first image and to send the same image in response to the instruction to capture the second image. An unauthorized user may take such actions knowing that an image depicting an authorized user is necessary to complete the requested action and that the device 102 is configured or instructed to capture the second image to verify the identity authentication. In this scenario, while the first image and the second image depict an authorized user, the exact similarity of the two images indicates that the unauthorized user is attempting to user the device 102.

In the third situation, the first image and the second image being substantially different may indicate that the user is an unauthorized user. For example, as with the second situation, the unauthorized user of the device may know that the image submitted in response to the request for a photograph must depict an authorized user to complete the requested action. As such, the unauthorized user may submit a previously-taken image of the authorized user instead of an image depicting the unauthorized user. However, the unauthorized user may not know that the device 102 is configured or instructed to capture a second image utilizing the camera 114 of the device 102. In this example, the second image may depict the unauthorized user and/or an environment that differs from the environment of the first image. In this situation, the first image, which depicts the authorized user, may differ substantially from the second image, which depicts the unauthorized user and/or a different environment. This information may be utilized to determine that the person depicted in the first image is not the user of the device 102.

The memory 128 may also include one or more databases 140. The databases 140 may store and/or access data and information of various types. By way of example, the databases 140 may store and/or access one or more user profiles and/or user accounts 142. The user profiles/accounts 142 may include identifying information about users of various devices, such as the device 102, as well as historical and/or contextual information associated with such users. This information may include, for example, facial features associated with the users, devices associated with the users, applications associated with the users, authentication information (such as passwords and/or biometric data) associated with the users, historical use of devices associated with the users, and/or other information. A user profile may be associated with one or more users, and/or a user account may be associated with one or more user profiles. The user profiles/accounts 142 may be utilized by the other components of the memory 128 to verify identity authentication, such as described herein.

The databases 140 may additionally, or alternatively, store and/or access one or more device identifications 144. A device identification 144 may indicate an internet protocol address and/or other identifying information associated with devices, such as the device 102. The device identification 144 may additionally include data indicating one or more relationships between devices. For example, the device 102 may be a mobile phone associated with a given user profile and/or user account. Other devices may also be associated with the user profile and/or the user account, such as, for example, a computer, a tablet, a router, a modem, a speaker, a voice-assistant device, a vehicle, and/or a network. Identification information for all or some of these devices may be stored and/or accessed using the device identification 144 component of the databases 140 to, for example, be utilized for verifying identity authentication.

The one or more databases 140 may additionally, or alternatively, include orientation data 146. The orientation data 146 may include information indicating one or more orientations of a device, or devices, that correspond to a person taking a photograph of him or herself with the device(s). The orientation data 146 may be received from one or more gyroscopes of the device(s). The orientation data 146 may be compared to data indicating the orientation of a device 102 when the first and/or second images are captured by the device 102, as explained above. In an authorized user situation, the data indicating the orientation of the device when an image is captured may be the same or similar to the orientation data 146. In an unauthorized situation, the data indicating the orientation of the device when an image is captured may differ, sometimes substantially, from the orientation data 146.

The one or more databases 140 may additionally, or alternatively, include resolution data 148. The resolution data 148 may indicate a resolution associated with a captured image and/or a resolution associated with a camera from which image data is received. For example, a given camera and/or a given device may be associated with a given resolution, which may be described as dots-per-inch (DPI). Additionally, or alternatively, an image captured by a camera may be associated with a given DPI. This resolution data 148 may be stored in the databases 140 and may be utilized for comparison to image data received for verifying identity authentication. For example, first image data corresponding to a first image may be received by the remote system 104. In addition, first resolution data corresponding to the first image may be received and may indicate that the first image was captured at a first resolution. In the example where a second image is automatically captured by the camera of the device, second resolution data corresponding to the second image may be received by the remote system 104. The first resolution data and the second resolution data may be compared to determine if the two resolutions are the same or substantially similar. In an authorized user situation, the two resolutions will be the same or substantially similar. In an unauthorized user situation, the two resolutions may differ, indicating that the first image is not an authentic image captured by the camera of the device for identity authentication. Additionally, or alternatively, the first resolution data may be compared to resolution data 148 associated with the device from which the first image data was received. In an authorized user situation, the first resolution data and the resolution data 148 for the device will be the same or substantially similar. In an unauthorized user situation, the first resolution data and the resolution data 148 for the device may differ.

All or some of the techniques, data, and information described above may be utilized for identity authentication verification. Additionally, while the examples provided herein are described with respect to one or two images being captured, it should be understood that any number of images may be captured. For example, in response to the first image being captured, sent, and or received, instead of just one additional image being captured automatically, several additional images may be captured automatically, which may be described as a burst mode.

Figure 2:
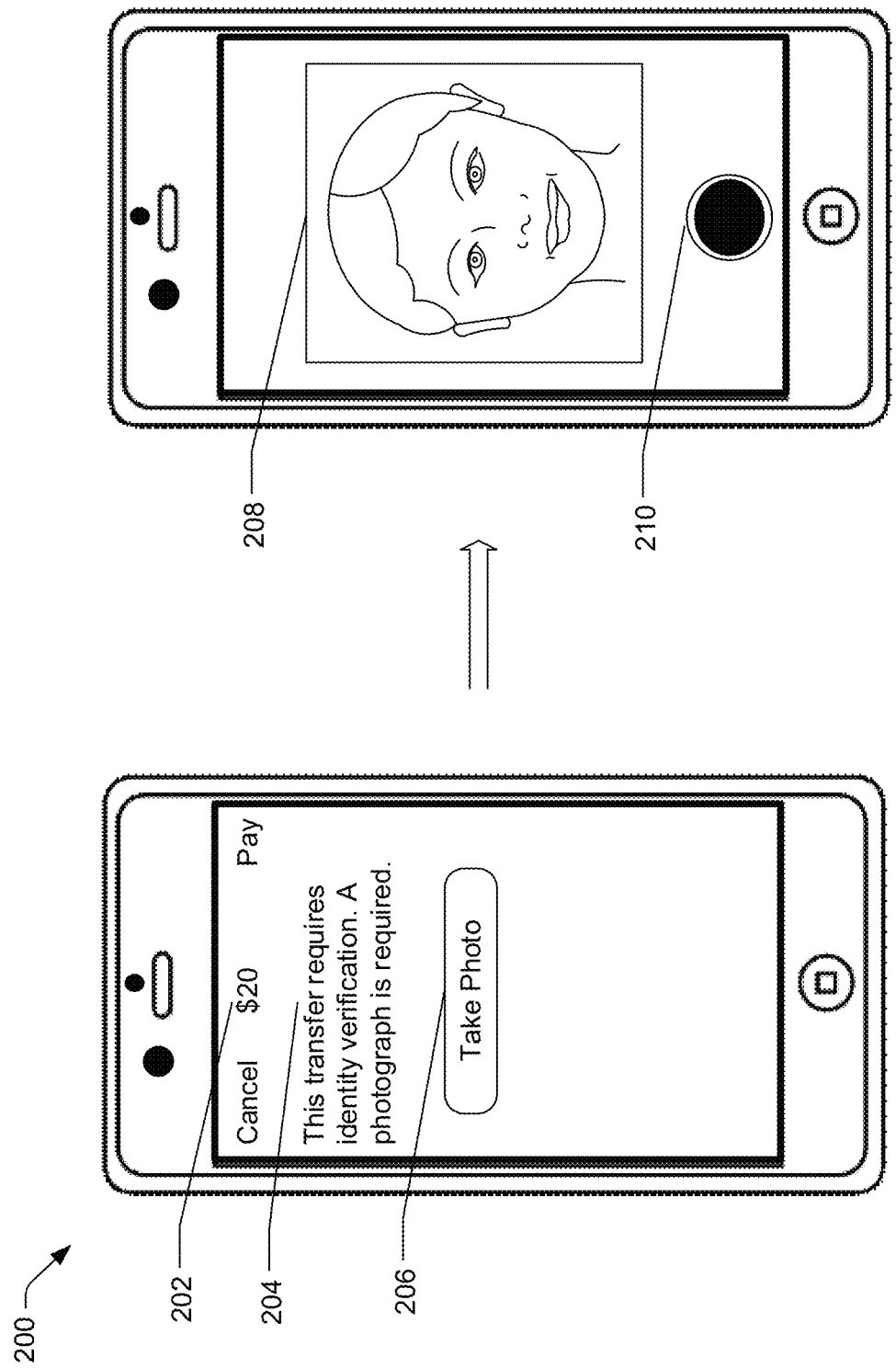
FIG. 2 depicts an example user interface utilized for identity authentication verification.

FIG. 2 depicts an example user interface 200, which may be utilized for identity authentication verification. The images of the user interface 200 as depicted in FIG. 2 represent a progression, from left to right, of changes to the user interface 200 as the user interacts with the user interface 200. The user interface 200 may display information from the payment application 122 as described with respect to FIG. 1, for example. In this example, a user may have requested, such as via a touchscreen of a device, that an amount of money 202 be transferred from one account to another. In the example shown with respect to FIG. 2, the amount of money 202 is depicted as "$20." Based at least in part on the user inputting such a request, and/or based at least in part on a remote system receiving the request, an identity authentication prompt 204 may be presented on the device. The identity authentication prompt 204 may include any audible and/or visual indication that, before the request can be fulfilled, identity authentication is required. In examples, the identity authentication prompt 204 may indicate that identity authentication will be performed at least in part utilizing an image depicting the user, such as via facial recognition. While the text and/or audio corresponding to the identity authentication prompt 204 may be any text and/or audio indicating the identity authentication is requested, example text shown in FIG. 2 is "This transfer requires identity verification. A photograph is required."

The user interface 200 may additionally include a camera enablement icon 206. The camera enablement icon 206 may be selectable by the user, such as, for example, by the user touching a portion of a screen corresponding to the camera enablement icon 206. Upon selection of the icon 206, the user may be presented with functionality allowing the user to take a photograph of his or herself. For example, selection of the icon 206 may cause a camera application, such as the camera application 120 from FIG. 1, to be enabled. The camera application may be displayed in the foreground of the application currently being used by the user. In this example, the camera application may limit the user's functionality to viewing a preview 208 or live feed from a camera of the device, capturing an image using a capture icon 210, and sending image data corresponding to the image to a remote system. This example implementation may prevent or hinder a user's ability to submit an inauthentic image for identity authentication. In other examples, selection of the icon 206 may open a camera application that is not associated with the payment application.

Based at least in part on a user selecting the capture icon 210, the camera of the device may capture an image and generate corresponding image data. That image data, and in instances, metadata associated with the image data may be sent from the device to a remote system for identity authentication. In addition to the image captured based at least in part on the user selecting the capture icon 210, one or more additional images may be automatically captured in response to the user selecting the capture icon 210, and/or the device sending the image data, and/or the remote system receiving the image data. In examples, upon downloading and/or accessing an application by which the request to perform the action is submitted from, the user of the device may consent to images being captured in the manner described herein. If the user does not consent to such images being captured, other identity authentication verification techniques, as described herein, may be utilized. Image data and/or associated metadata for the additional images may be sent from the device to the remote system.

Figure 3:
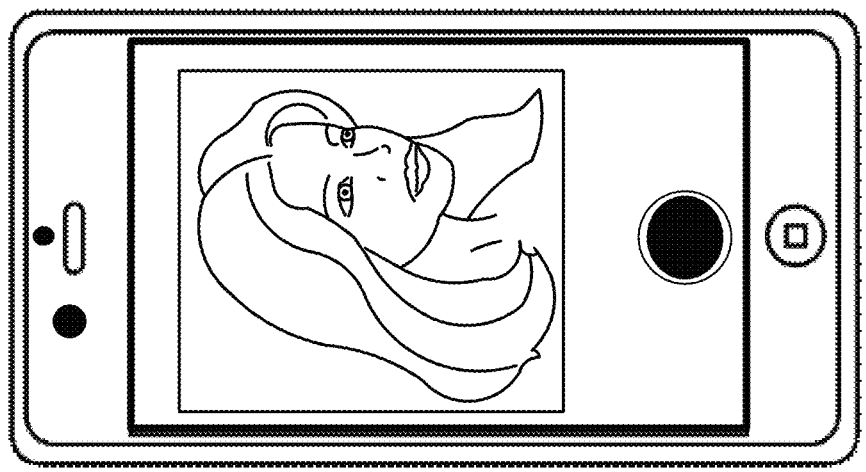
FIG. 3 depicts an example of images captured during image integrity and source verification.
Figure 3:
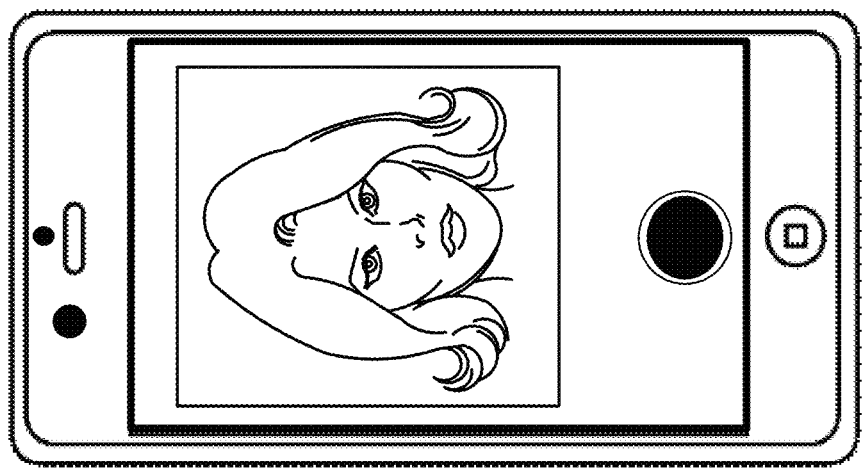

FIG. 3 depicts an example user interface 300 of images captured during identity authentication verification, particularly where the images are substantially similar. The user interface 300 on the left side of FIG. 3 corresponds to a first image 302 provided by a user, such as in response to a request to supply a photograph for identity authentication. In an example, the user may request that the device, an application, and/or a remote system perform an action, such as the transfer of funds from one account to another account. The device, application, and/or remote system may request that the user take a photograph and submit it for identity authentication. The user may utilize a camera application to view and capture an image of him or herself. Upon the image being captured, corresponding image data may be sent from the device to a remote system.

Based at least in part on the first image 302 being captured, and/or upon the device sending the image data, and/or upon the remote system receiving the image data, the device, the application, and/or the remote system may cause the camera of the device to capture a second image. The user interface 300 on the right side of FIG. 3 depicts the second image 304 captured by the camera. In examples, upon downloading and/or accessing an application by which the request to perform the action is submitted from, the user of the device may consent to images being captured in the manner described herein. If the user does not consent to such images being captured, other identity authentication verification techniques, as described herein, may be utilized. Additionally, or alternatively, multiple additional images may be captured. Second image data corresponding to the second image 304 may be sent from the device to the remote system.

A comparison of the first image data and the second image data may be performed by the remote system. The comparison may include, for example, identifying similarities and/or dissimilarities of one or more aspects of the first image data and the second image data. The aspects of the first image data and/or the second image data may include, for example, colors, positions of colors, presence of items depicted in the images, absence of items from the images, changes in positions of items depicted in the images, facial feature dissimilarities, facial feature similarities, and/or lighting.

In the example depicted in FIG. 3, aspects of the first image 302 are substantially similar to aspects of the second image 304. As used herein, image aspects being substantially similar may correspond to a percentage, or other metric, of the aspects being the same. For example, substantially similar aspects may correspond to at least 90% similarity, at least 91% similarity, at least 92% similarity, at least 93% similarity, at least 94% similarity, at least 95% similarity, at least 96% similarity, at least 97% similarity, at least 98% similarity, or at least 99% similarity. Based at least in part on the determination that the first image is substantially similar to the second image, it may be determined that the first image is an authentic photograph of the user of the device. In response to determining that the first image is authentic, the device, the application, and/or the remote system may perform the action and/or continue the identity authentication process.

Figure 4:
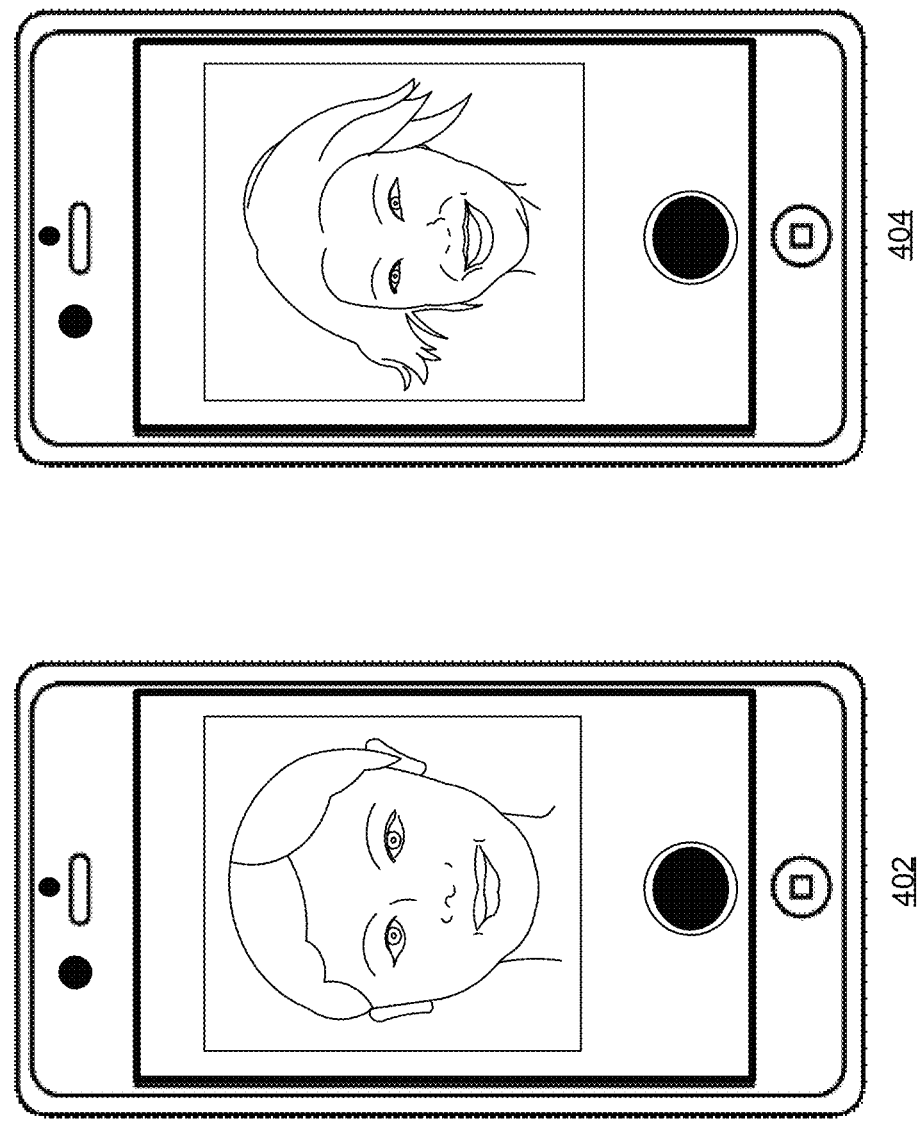
FIG. 4 depicts another example of images captured during identity authentication verification.

FIG. 4 depicts an example user interface 400 of images captured during identity authentication verification, particularly where the images are substantially different. The user interface 400 on the left side of FIG. 4 corresponds to a first image 402 provided by a user, such as in response to a request to supply a photograph for identity authentication. In an example, the user may request that the device, an application, and/or a remote system perform an action, such as the transfer of funds from one account to another account. The device, application, and/or remote system may request that the user take a photograph and submit it for identity authentication. The user may utilize a camera application to view and capture an image of him or herself. Upon the image being captured, corresponding image data may be sent from the device to a remote system.

Based at least in part on the first image 402 being captured, and/or upon the device sending the image data, and/or upon the remote system receiving the image data, the device, the application, and/or the remote system may cause the camera of the device to capture a second image. The user interface 400 on the right side of FIG. 4 depicts the second image 404 captured by the camera. In examples, upon downloading and/or accessing an application by which the request to perform the action is submitted from, the user of the device may consent to images being captured in the manner described herein. If the user does not consent to such images being captured, other identity authentication verification techniques, as described herein, may be utilized. Additionally, or alternatively, multiple additional images may be captured. Second image data corresponding to the second image 404 may be sent from the device to the remote system.

A comparison of the first image data and the second image data may be performed by the remote system. The comparison may include, for example, identifying similarities and/or dissimilarities of one or more aspects of the first image data and the second image data. The aspects of the first image data and/or the second image data may include, for example, colors, positions of colors, presence of items depicted in the images, absence of items from the images, changes in positions of items depicted in the images, facial feature dissimilarities, facial feature similarities, and/or lighting.

In the example depicted in FIG. 4, aspects of the first image 402 are substantially different from aspects of the second image 404. As used herein, image aspects being substantially different may correspond to a percentage, or other metric, of the aspects being dissimilar. For example, substantially different aspects may correspond to at least 10% dissimilarity, at least 9% dissimilarity, at least 8% dissimilarity, at least 7% dissimilarity, at least 6% dissimilarity, at least 5% dissimilarity, at least 4% dissimilarity, at least 3% dissimilarity, at least 2% dissimilarity, or at least 1% dissimilarity. Based at least in part on the determination that the first image is substantially dissimilar to the second image, it may be determined that the first image is not an authentic photograph of the user of the device. In response to determining that the first image is not authentic, the device, the application, and/or the remote system may refrain from performing the action and/or may require additional identity authentication before the action may be performed.

Figure 5:
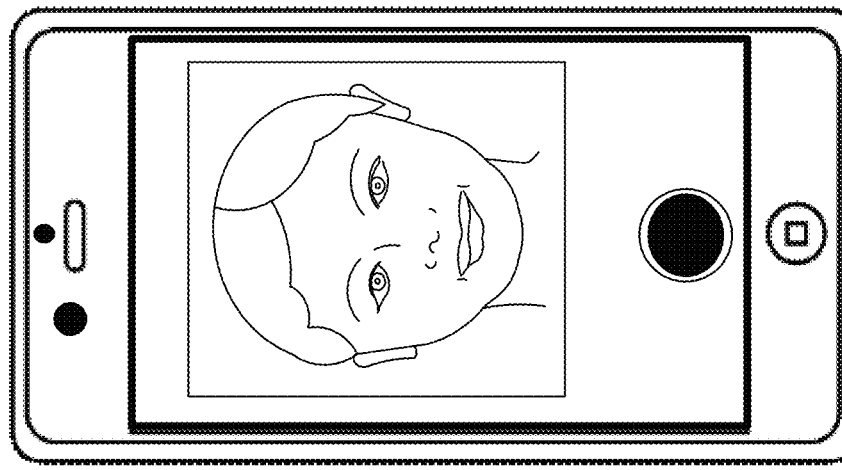
FIG. 5 depicts another example of images captured during identity authentication verification.
Figure 5:
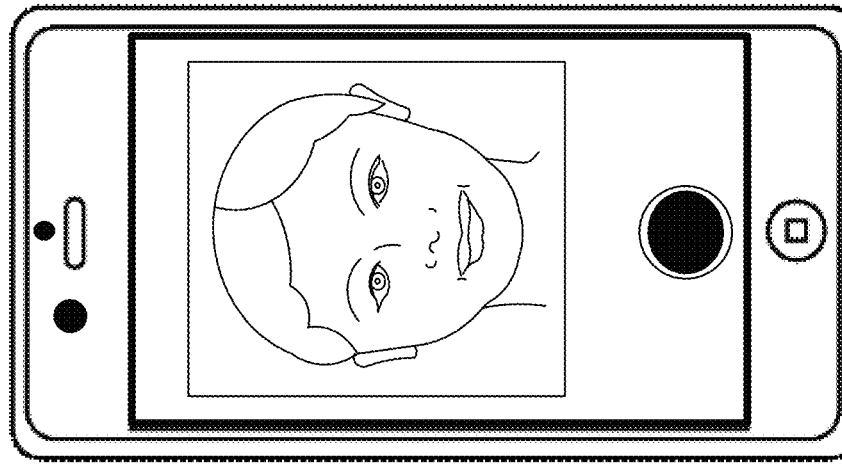

FIG. 5 depicts an example user interface 500 of images captured during identity authentication verification, particularly where the images are exactly the same. The user interface 500 on the left side of FIG. 5 corresponds to a first image 502 provided by a user, such as in response to a request to supply a photograph for identity authentication. In an example, the user may request that the device, an application, and/or a remote system perform an action, such as the transfer of funds from one account to another account. The device, application, and/or remote system may request that the user take a photograph and submit it for identity authentication. The user may utilize a camera application to view and capture an image of him or herself. Upon the image being captured, corresponding image data may be sent from the device to a remote system.

Based at least in part on the first image 502 being captured, and/or upon the device sending the image data, and/or upon the remote system receiving the image data, the device, the application, and/or the remote system may cause the camera of the device to capture a second image. The user interface 500 on the right side of FIG. 5 depicts the second image 504 captured by the camera. In examples, upon downloading and/or accessing an application by which the request to perform the action is submitted from, the user of the device may consent to images being captured in the manner described herein. If the user does not consent to such images being captured, other identity authentication verification techniques, as described herein, may be utilized. Additionally, or alternatively, multiple additional images may be captured. Second image data corresponding to the second image 504 may be sent from the device to the remote system.

A comparison of the first image data and the second image data may be performed by the remote system. The comparison may include, for example, identifying similarities and/or dissimilarities of one or more aspects of the first image data and the second image data. The aspects of the first image data and/or the second image data may include, for example, colors, positions of colors, presence of items depicted in the images, absence of items from the images, changes in positions of items depicted in the images, facial feature dissimilarities, facial feature similarities, and/or lighting.

In the example depicted in FIG. 5, aspects of the first image 502 are exactly the same as aspects of the second image 504. As used herein, image aspects being exactly the same may correspond to a percentage, or other metric, of the aspects being the same. For example, exactly the same may correspond to 100% similarity, at least 99.9% similarity, at least 99.8% similarity, at least 99.7% similarity, at least 99.6% similarity, at least 99.5% similarity, at least 99.4% similarity, at least 99.3% similarity, at least 99.2% similarity, or at least 99.1% similarity. Based at least in part on the determination that the first image is exactly the same as the second image, it may be determined that the first image is not an authentic photograph of the user of the device. In response to determining that the first image is not authentic, the device, the application, and/or the remote system may refrain from performing the action and/or may require additional identity authentication before the action may be performed.

Figure 6:
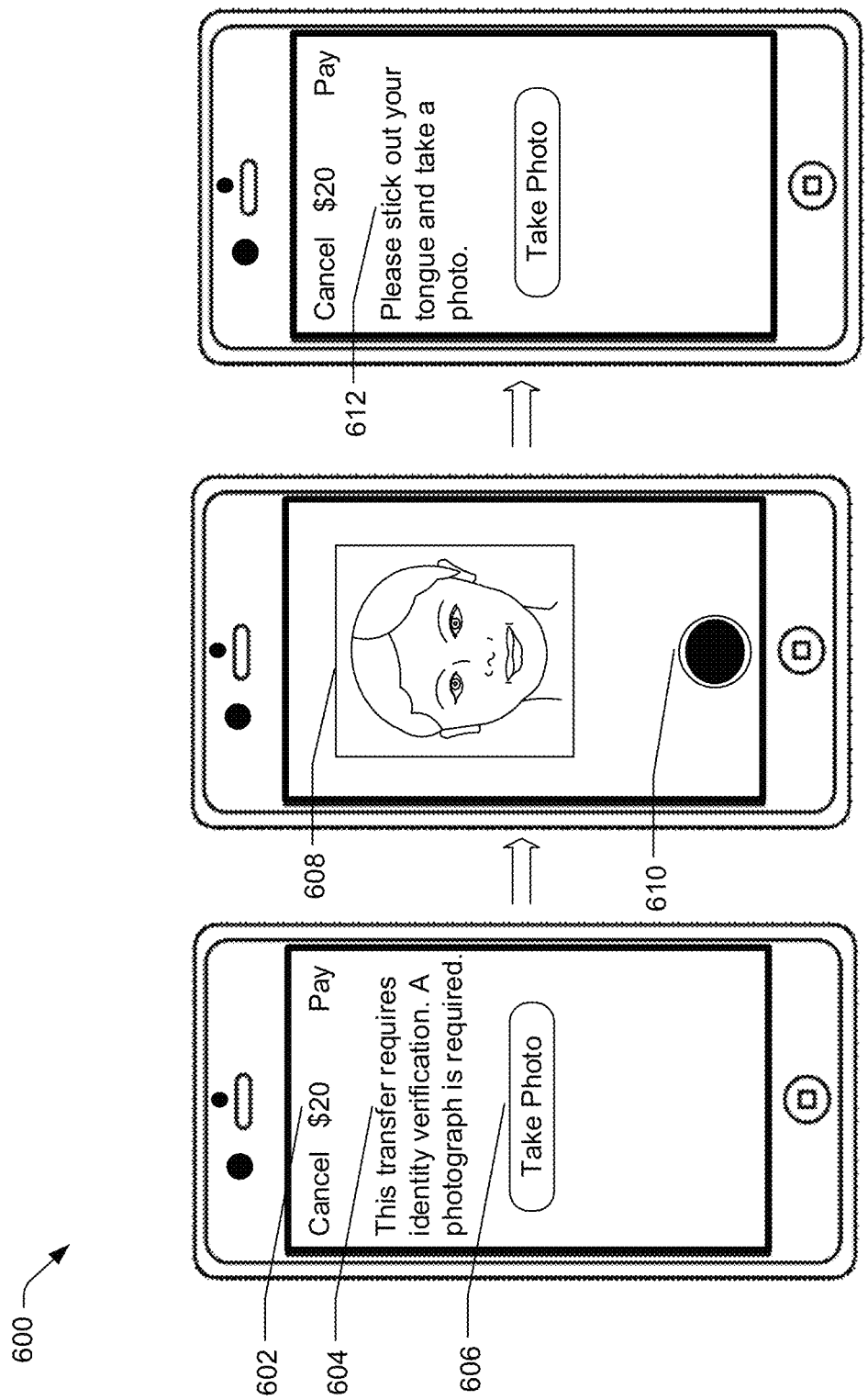
FIG. 6 depicts an example user interface for querying a user for identity authentication verification.

FIG. 6 depicts an example user interface 600 for querying a user for identity authentication verification. The images of the user interface 600 as depicted in FIG. 6 represent a progression, from left to right, of changes to the user interface 600 as the user interacts with the user interface 600. The user interface 600 may display information from the payment application 122 as described with respect to FIG. 1, for example. In this example, a user may have requested, such as via a touchscreen of a device, that an amount of money 602 be transferred from one account to another. In the example shown with respect to FIG. 6, the amount of money 602 is depicted as "$20." Based at least in part on the user inputting such a request, and/or based at least in part on a remote system receiving the request, an identity authentication prompt 604 may be presented on the device. The identity authentication prompt 604 may include any audible and/or visual indication that, before the request can be fulfilled, identity authentication is required. In examples, the identity authentication prompt 604 may indicate that identity authentication will be performed at least in part utilizing an image depicting the user, such as via facial recognition. While the text and/or audio corresponding to the identity authentication prompt 604 may be any text and/or audio indicating the identity authentication is requested, example text shown in FIG. 6 is "This transfer requires identity verification. A photograph is required."

The user interface 600 may additionally include a camera enablement icon 606. The camera enablement icon 606 may be selectable by the user, such as, for example, by the user touching a portion of a screen corresponding to the camera enablement icon 606. Upon selection of the icon 606, the user may be presented with functionality allowing the user to take a photograph of his or herself. For example, selection of the icon 606 may cause a camera application, such as the camera application 120 from FIG. 1, to be enabled. The camera application may be displayed in the foreground of the application currently being used by the user. In this example, the camera application may limit the user's functionality to viewing a preview 608 or live feed from a camera of the device, capturing an image using a capture icon 610, and sending image data corresponding to the image to a remote system. This example implementation may prevent or hinder a user's ability to submit an inauthentic image for identity authentication. In other examples, selection of the icon 606 may open a camera application that is not associated with the payment application.

Based at least in part on the remote system receiving the image data corresponding to the image, one or more techniques for verifying identity authentication may be utilized, as described above. For example, facial recognition may be performed, image data comparison may be performed, timing information may be analyzed, location information may be analyzed, orientation information may be analyzed, resolution information may be analyzed, and/or device and/or camera identification information may be analyzed, for example. In some instances, the one or more techniques for verifying identity authentication, as described herein, may result in the submitted image not being authenticated and/or being authenticated at a low level of confidence. In these instances, the remote system may send data to the device that causes a query 612 to be presented. The query 612 may correspond to text data that may displayed on a screen of the device and/or the query 612 may correspond to audio data that may be output via one or more speakers of the device. In the example shown in FIG. 6, the query 612 corresponds to text data, specifically "Please stick out your tongue and take a photo." It should be understood that the text used in the example of FIG. 6 is provided for illustration only and should not be construed as a limitation. Instead, any text and/or audio query 612 may be utilized.

Based at least in part on the query 612, a user of the device may perform the requested action, which in the example of FIG. 6 requires the user to perform a physical action and take a photograph of the user performing that action. In this example, image data corresponds to the image captured by the camera depicting the user sticking out his or her tongue may be sent to the remote system for processing. The remote system may receive the image data and may perform facial recognition analysis or other analysis to identity a portion of the image data corresponding to a tongue. In this example, the remote system may identify the tongue based at least in part on color data, shape data, and/or data indicating a positional relationship between facial features. In instances where the remote system determines that the user has performed the action from the query 612, such as above a threshold confidence level, the remote system may verify that the person depicted in the image is the user of the device. In instances where the remote system determines that the user has not performed the action, and/or when the remote system does not receive a response to the query 612, the remote system may cancel the requested action and/or may present one or more additional and/or different queries 612 for the user to perform.

Figure 7:
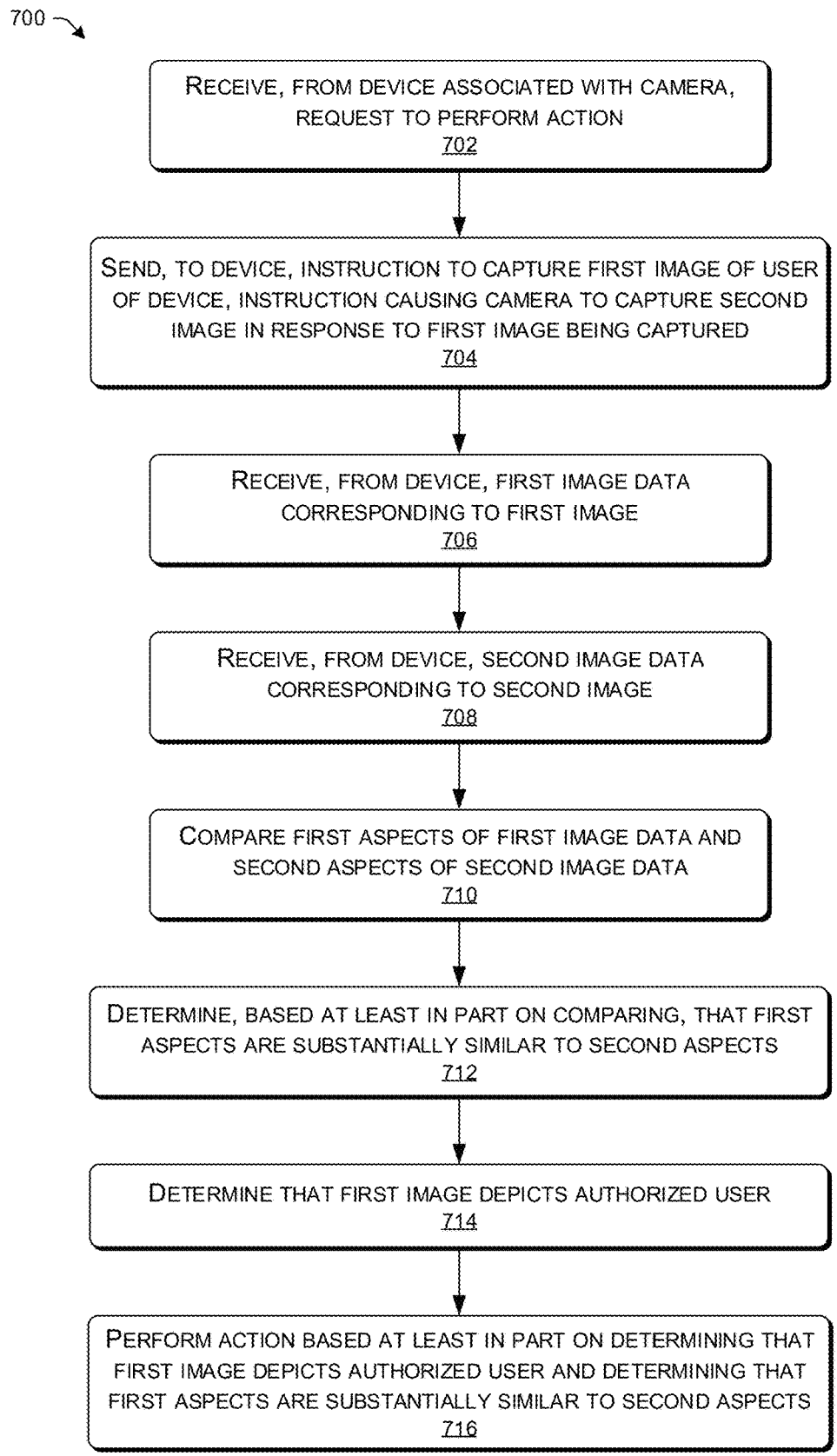
FIG. 7 depicts a non-limiting flow diagram illustrating a process for identity authentication verification.
Figure 8:
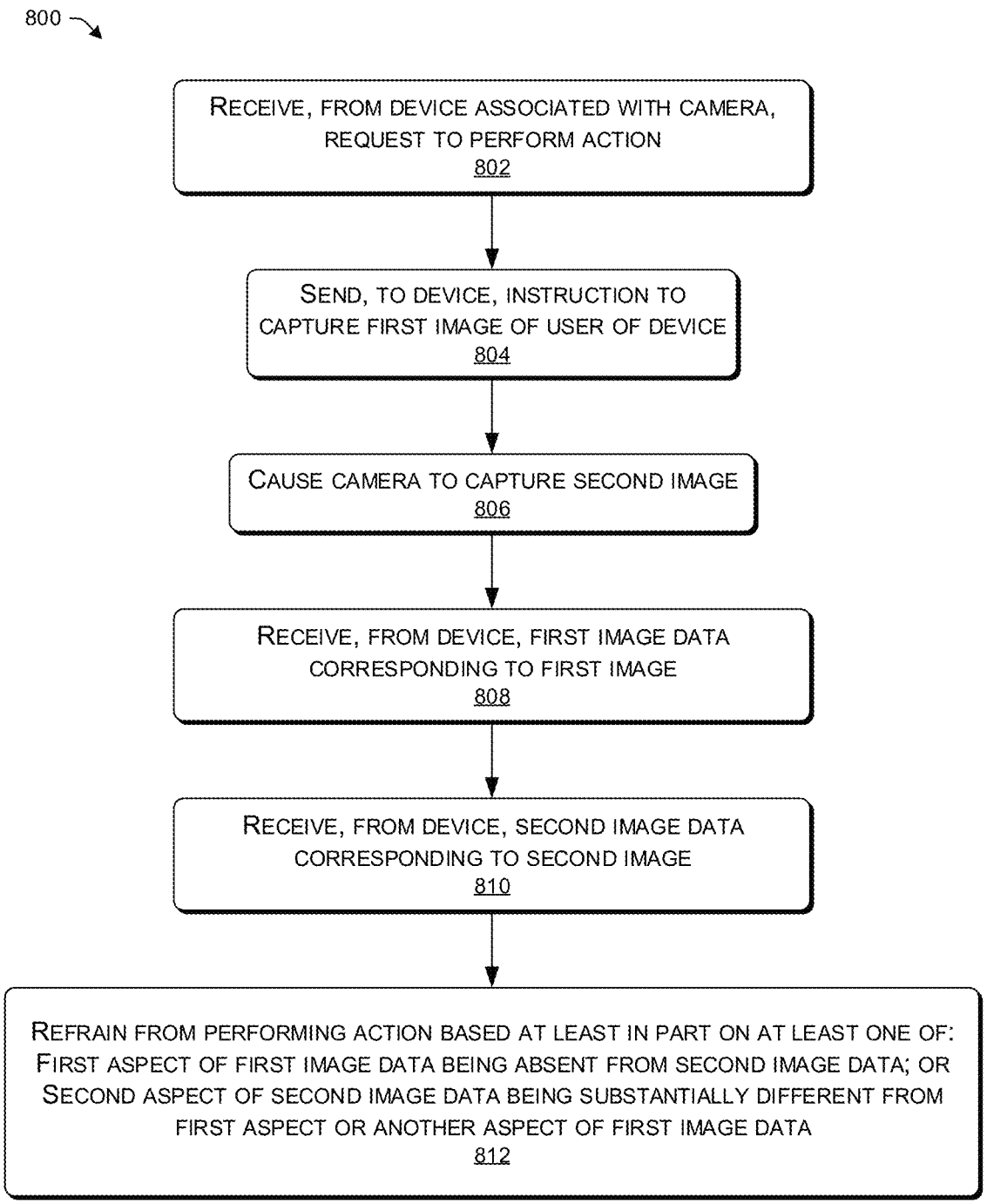
FIG. 8 depicts another non-limiting flow diagram illustrating a process for identity authentication verification.
Figure 9:
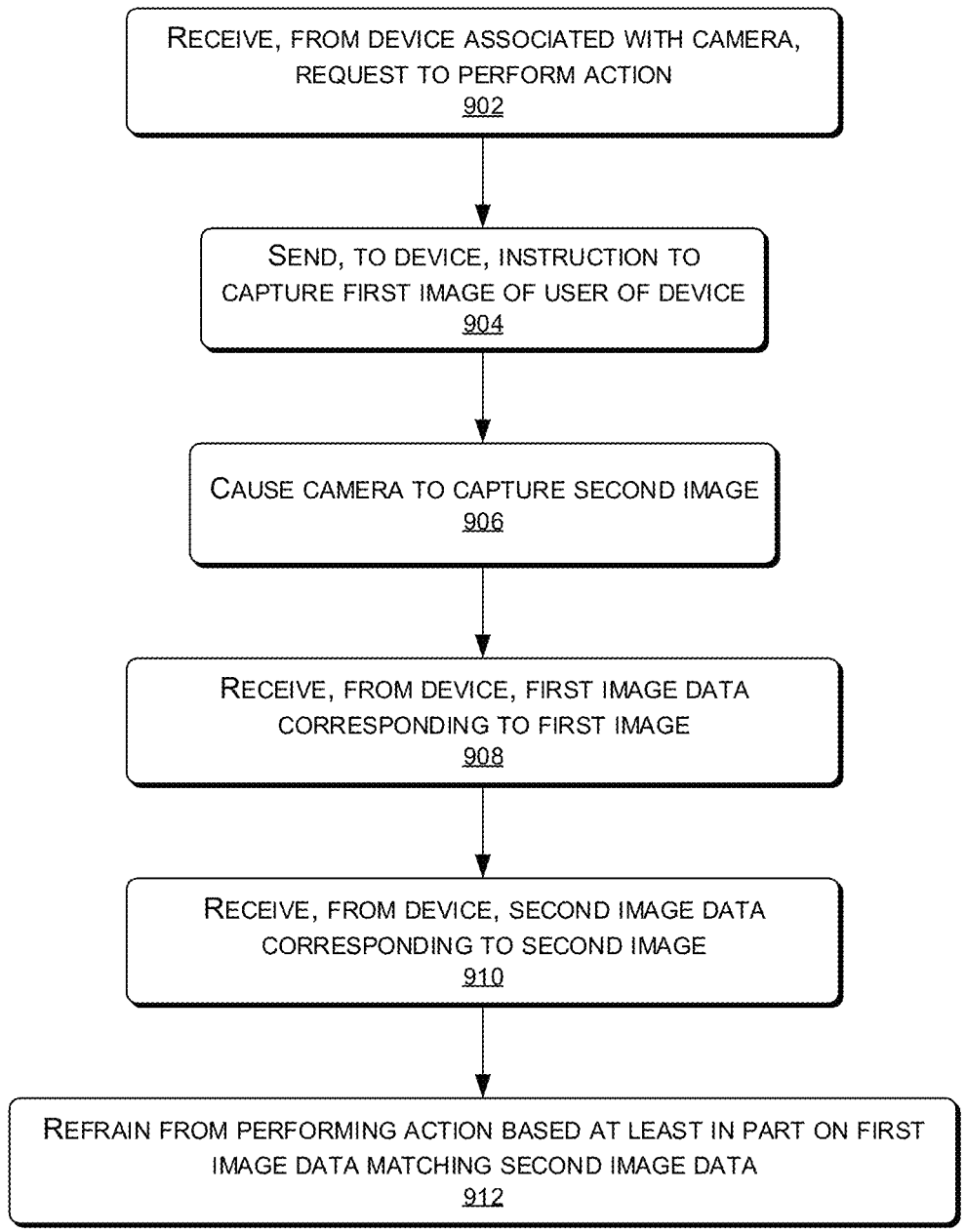
FIG. 9 depicts another non-limiting flow diagram illustrating a process for identity authentication verification.

FIGS. 7-9 illustrate various processes for identity authentication verification. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, although the processes may be implemented in a wide variety of other environments, architectures and systems.

FIG. 7 depicts a non-limiting flow diagram illustrating a process 700 for image integrity and source verification.

At block 702, the process 700 may include receiving, from a device associated with a camera, a request to perform an action. By way of example, the device may be a mobile phone, a vehicle, television, voice-assistant device, speaker, headset, etc. The device may be associated with one camera or multiple cameras. The one or more cameras may be physical components of the device or the one or more cameras may be separate components from the device and may be in electronic communication with the device, such that the device may control functionality of the one or more cameras. The request to perform an action may be, in examples, any action. However, in some non-limiting examples, the request may correspond to a request to make a monetary transaction, such as, for example, the transfer of money between accounts, the withdrawal of money, the deposit of money, and/or other types of transactions. In general, the action may be any action where identity authentication of the user of the device is required and/or desired.

At block 704, the process 700 may include sending, to the device, an instruction to capture a first image of a user of the device. The instruction may cause the camera to capture a second image in response to the first image being captured and/or in response to image data corresponding to the first image being received. The processes described with respect to block 704 may be performed by a remote system and/or by the device associated with the camera. In examples where the processes are performed by a remote system, the remote system may receive data from the device that indicates that the user of the device has requested the action to be performed. The remote system may determine that the requested action is a type of action that requires identity authentication. For example, if the requested action is a request to transfer funds between accounts, the remote system may require that the user of the device be authorized to make such as request. Based at least in part on the determination that the requested action requires identity authentication, the remote system may send data to the device indicating that identity authentication is required. In other examples, certain actions may be predefined as requiring identity authentication and data indicating as much may be stored on the device. In these situations, an indication that identity authentication is required may be presented to the user of the device before the user submits a request to perform the action. As such, the remote system may receive the request to perform the action and data associated with the identity authentication.

In examples, the remote system and/or the device may present a request for the user of the device to capture an image of the user using the camera of the device. Based at least in part on the camera capturing the image, the camera may generate corresponding image data. Timing information, location information, camera identity information, device identity information, orientation information, and/or resolution information associated with the image data may also be generated. In some examples, the remote system and/or the device may cause the camera of the device to capture a second image based at least in part on the first image being captured and/or the device sending the first image data to the remote system. The second image may be captured within a fraction of a second, a second, and/or multiple seconds of the first image being captured. In examples, upon downloading and/or accessing an application by which the request to perform the action is submitted from, the user of the device may consent to images being captured in the manner described herein. If the user does not consent to such images being captured, other identity authentication verification techniques, as described herein, may be utilized. Second image data corresponding to the second image may be sent to the remote system along with, in examples, timing information, location information, camera identity information, device identity information, orientation information, and/or resolution information associated with the second image.

At block 706, the process 700 may include receiving, from the device, first image data corresponding to the first image. Metadata such as the timing information, location information, camera identity information, device identity information, orientation information, and/or resolution information may also be received. The first image data and/or the metadata may be received utilizing the networks and network interfaces as described herein.

At block 708, the process 700 may include receiving, from the device, second image data corresponding to the second image. Metadata such as the timing information, location information, camera identity information, device identity information, orientation information, and/or resolution information associated with the second image may also be received. The second image data and/or the metadata may be received utilizing the networks and network interfaces as described herein.

At block 710, the process 700 may include comparing first aspects of the first image data and second aspects of the second image data. The processes described with respect to block 710 may be utilized to verify identity authentication. The one or more aspects may include the presence of one or more objects depicted in the images, characteristics of the one or more objects, lighting associated with the images, and/or facial features of one or more people depicted in the images. By way of example, the remote system may identify aspects of the image data based at least in part on color data, depth data, shape data, lighting data, and/or other data associated with images to identify the one or more objects depicted in the images. When the image depicts a face, one or more facial recognition techniques, as described herein, may be performed to determine characteristics associated with the face. The aspects of the first image data and the second image data may be compared to determine similarities and dissimilarities between the two images.

At block 712, the process 700 may include determining, based at least in part on the comparison performed at block 710, that the first aspects are substantially similar to the second aspects. This situation may indicate that an authorized user is using the device. This is because, while many aspects of the two images should be the same, subtle differences as between the first image and the second image should be identified based on the first image being captured at a different time than the second image. These subtle differences may be a slight change in the position of one or more objects depicted in the images and/or a change to one or more facial features of the person depicted in the images. For example, a person capturing a photograph of him or herself may smile while capturing the photograph, but that person may cease smiling after the photograph is taken. In this example, the first image may depict the user smiling while the second image may depict the user not smiling. Differences such as these indicate that the first image is an authentic image of the user of the device at the time of the request to take a photograph.

As used herein, image aspects being substantially similar may correspond to a percentage, or other metric, of the aspects being the same. For example, substantially similar aspects may correspond to at least 90% similarity, at least 91% similarity, at least 92% similarity, at least 93% similarity, at least 94% similarity, at least 95% similarity, at least 96% similarity, at least 97% similarity, at least 98% similarity, or at least 99% similarity.

At block 714, the process 700 may include determining that the first image depicts an authorized user. This determination may be based at least in part on performing facial recognition techniques, as described herein, to identify one or more facial characteristics of a person depicted in the image and comparing the one or more facial characteristics to reference facial characteristics of at least one authorized user. When the facial characteristics of the person depicted in the image match or substantially match the reference facial characteristics, it may be determined that the image depicts an authorized user. At block 716, the process 700 may include performing the action based at least in part on determining that the image depicts an authorized user and determining that the first aspects are substantially similar to the second aspects.

Additionally, or alternatively, the process 700 may include analyzing the location information received from the device. The location information may indicate a location, such as a global positioning location, that the first image was captured at. Location information may also be associated with the second image. In an authorized user situation, the location information associated with the first image will indicate that the first image was captured at or near the location of the second image. In an unauthorized user situation, the location information may indicate that the first image was captured at a different location than the second image. In examples, the determination that the first image was captured at a different location than the second image may be based at least in part on a distance between the two locations being at least a threshold distance. The threshold distance may be static or dynamic. For example, the threshold distance may be set to at least 10 feet, at least 25 feet, at least 50 feet, at least 100 feet, at least 300 feet, at least 0.25 miles, at least 0.5 miles, or at least 1 mile. Additional, or alternative metrics may be used and/or other considerations may be utilized, such as whether the images were captured in different buildings, different cities, different counties, different states and/or territories, and/or different countries. Additionally, or alternatively, the location information may be used in conjunction with the time information and results of facial recognition techniques to determine that two images depicting the same person have been submitted at or near the same time but at different locations.

Additionally, or alternatively, the process 700 may include analyzing the timing information received from the device. Timing information may be associated with the first image and the second image. The timing information may indicate a time, such as a time of day and/or a day of the year, that the first image was captured. In an authorized user situation, the timing information associated with the first image will indicate that the first image was captured shortly before or after the second image. In an unauthorized user situation, the timing information associated with the first image will indicate that the first image was captured more than a threshold amount of time before or after the second image was captured. This unauthorized user situation may occur when the first image was provided from a camera roll or other image storage and not taken in response to the request for the photograph.

Additionally, or alternatively, the process 700 may include determining that an object is in motion based at least in part on analysis of the first image data and the second image data. For example, an object identified as depicted in the first image may be associated with a first location or a first position. Analysis of the second image data may reveal that the object has moved to a second location or a second position. Based at least in part on this determination, it may be determined that the object is in motion. Determining that the same object appears in both images and that the object is in motion may support a determination that the first image is an authentic image captured by the camera in response to the request for an image for identity authentication.

Additionally, or alternatively, the process 700 may include determining that the device from which the first and second images were received from is in electronic communication with another device and that the two devices are associated with the same profile and/or account. By way of example, the device may be a mobile phone and the second device may be, for example, a vehicle, television, voice-assistant device, speaker, headset, etc. If the device and the other device are in electronic communication with each other, such as via Bluetooth pairing, it may be determined that the user depicted in the first image is the user of the device.

FIG. 8 depicts another non-limiting flow diagram illustrating a process 800 for image integrity and source verification.

At block 802, the process 800 may include receiving, from a device associated with a camera, a request to perform an action. By way of example, the device may be a mobile phone, a vehicle, television, voice-assistant device, speaker, headset, etc. The device may be associated with one camera or multiple cameras. The one or more cameras may be physical components of the device or the one or more cameras may be separate components from the device and may be in electronic communication with the device, such that the device may control functionality of the one or more cameras. The request to perform an action may be, in examples, any action. However, in some non-limiting examples, the request may correspond to a request to make a monetary transaction, such as, for example, the transfer of money between accounts, the withdrawal of money, the deposit of money, and/or other types of transactions. In general, the action may be any action where identity authentication of the user of the device is required and/or desired.

At block 804, the process 800 may include sending, the device, an instruction to capture a first image of a user of the device. The remote system may receive data from the device that indicates that the user of the device has requested the action to be performed. The remote system may determine that the requested action is a type of action that requires identity authentication. For example, if the requested action is a request to transfer funds between accounts, the remote system may require that the user of the device be authorized to make such as request. Based at least in part on the determination that the requested action requires identity authentication, the remote system may send data to the device indicating that identity authentication is required. In other examples, certain actions may be predefined as requiring identity authentication and data indicating as much may be stored on the device. In these situations, an indication that identity authentication is required may be presented to the user of the device before the user submits a request to perform the action. As such, the remote system may receive the request to perform the action and data associated with the identity authentication. In examples, the remote system and/or the device may present a request for the user of the device to capture an image of the user using the camera of the device. Based at least in part on the camera capturing the image, the camera may generate corresponding image data. Timing information, location information, camera identity information, device identity information, orientation information, and/or resolution information associated with the image data may also be generated.

At block 806, the process 800 may include causing the camera or another camera associated with the device to capture a second image. Causing the camera to capture a second image may be performed by sending an instruction to the device to cause the camera to capture a second image in response to the first image being captured and/or in response to receiving image data corresponding to the first image. In other examples, the second image may be captured before the first image is captured, such as, for example, in response to the user opening the application, making a selection associated with the application, turning on the device, and/or waking the device. The processes described with respect to block 804 may be performed by a remote system and/or by the device associated with the camera. The second image may be captured within a fraction of a second, a second, and/or multiple seconds of the first image being captured. In examples, upon downloading and/or accessing an application by which the request to perform the action is submitted from, the user of the device may consent to images being captured in the manner described herein. If the user does not consent to such images being captured, other identity authentication verification techniques, as described herein, may be utilized. Second image data corresponding to the second image may be sent to the remote system along with, in examples, timing information, location information, camera identity information, device identity information, orientation information, and/or resolution information associated with the second image.

At block 808, the process 800 may include receiving, from the device, first image data corresponding to the first image. Metadata such as the timing information, location information, camera identity information, device identity information, orientation information, and/or resolution information may also be received. The first image data and/or the metadata may be received utilizing the networks and network interfaces as described herein.

At block 810, the process 800 may include receiving, from the device, second image data corresponding to the second image. Metadata such as the timing information, location information, camera identity information, device identity information, orientation information, and/or resolution information associated with the second image may also be received. The second image data and/or the metadata may be received utilizing the networks and network interfaces as described herein.

At block 812, the process 800 may include refraining from performing the action based at least in part on one or more factors. The factors may include a first aspect of the first image data being absent from the second image data and/or a second aspect of the second image data being substantially different from the first aspect or another aspect of the first image data. The aspects may include the presence of one or more objects depicted in the images, characteristics of the one or more objects, lighting associated with the images, and/or facial features of one or more people depicted in the images. By way of example, the remote system may identify aspects of the image data based at least in part on color data, depth data, shape data, lighting data, and/or other data associated with images to identify the one or more objects depicted in the images. When the image depicts a face, one or more facial recognition techniques, as described herein, may be performed to determine characteristics associated with the face. The aspects of the first image data and the second image data may be compared to determine similarities and dissimilarities between the two images. For example, substantially all of the aspects of the first image should be the same or similar to the aspect of the second image in situations where the first image is an authentic image submitted in response to the request for identity authentication. However, in unauthorized user situations, the first image may be a picture of a picture, or an image previously captured and stored, for example, on a camera roll associated with the device. In these examples, the first image will likely be substantially different than the second image because one or more aspects of the first image will not be present in the second image. These aspects may include the presence of an object in the first image and the absence of that object in the second image. These aspects may additionally or alternatively include an aspect of the second image being substantially different from one or more aspects of the first image.

As used herein, image aspects being substantially different may correspond to a percentage, or other metric, of the aspects being dissimilar. For example, substantially different aspects may correspond to at least 10% dissimilarity, at least 9% dissimilarity, at least 8% dissimilarity, at least 7% dissimilarity, at least 6% dissimilarity, at least 5% dissimilarity, at least 4% dissimilarity, at least 3% dissimilarity, at least 2% dissimilarity, or at least 1% dissimilarity.

Refraining from performing the action may include canceling the request to perform the action and/or causing the device to present an indication to the user of the device that the request has been canceled. Additionally, or alternatively, the remote system and/or the device may present a query to the user of the device. The query may request that the user perform an action before the remote system will perform the requested action.

Additionally, or alternatively, the process 800 may include analyzing the location information received from the device. The location information may indicate a location, such as a global positioning location, that the first image was captured at. Location information may also be associated with the second image. In an authorized user situation, the location information associated with the first image will indicate that the first image was captured at or near the location of the second image. In an unauthorized user situation, the location information may indicate that the first image was captured at a different location than the second image. In examples, the determination that the first image was captured at a different location than the second image may be based at least in part on a distance between the two locations being at least a threshold distance. The threshold distance may be static or dynamic. For example, the threshold distance may be set to at least 10 feet, at least 25 feet, at least 50 feet, at least 100 feet, at least 300 feet, at least 0.25 miles, at least 0.5 miles, or at least 1 mile. Additional, or alternative metrics may be used and/or other considerations may be utilized, such as whether the images were captured in different buildings, different cities, different counties, different states and/or territories, and/or different countries. Additionally, or alternatively, the location information may be used in conjunction with the time information and results of facial recognition techniques to determine that two images depicting the same person have been submitted at or near the same time but at different locations.

Additionally, or alternatively, the process 800 may include analyzing the timing information received from the device. Timing information may be associated with the first image. The timing information may indicate a time, such as a time of day and/or a day of the year, that the first image was captured. Timing information may also be associated with the second image. In an authorized user situation, the timing information associated with the first image will indicate that the first image was captured shortly before or after the second image. In an unauthorized user situation, the timing information associated with the first image will indicate that the first image was captured more than a threshold amount of time before or after the second image was captured. This unauthorized user situation may occur when the first image was provided from a camera roll or other image storage and not taken in response to the request for the photograph. Additionally, or alternatively, the timing information may indicate that the first image was sent and/or received more than a threshold amount of time from when the user was presented with the request to capture an image for identity authentication purposes. The threshold amount of time may be, for example, a matter of seconds or a matter of minutes. In this situation, the amount of time between requesting the image and sending and/or receiving the corresponding image data may indicate that the user is attempting to submit an image that is not an authentic image of the user. The remote system may refrain from performing the requested action based at least in part on this analysis.

Additionally, or alternatively, the process 800 may include analyzing the orientation data to determine if a person depicted in the first image is the user of the device. The orientation data may include information indicating one or more orientations of the device that correspond to a person taking a photograph of him or herself with the device. The orientation data may be received from one or more gyroscopes of the device, for example. The orientation data may be compared to data indicating the orientation of a device when the first and/or second images are captured by the device, as explained above. In an authorized user situation, the data indicating the orientation of the device when an image is captured may be the same or similar to the orientation data. In an unauthorized situation, the data indicating the orientation of the device when an image is captured may differ, sometimes substantially, from the orientation data.

FIG. 9 depicts another non-limiting flow diagram illustrating a process 900 for image integrity and source verification.

At block 902, the process 900 may include receiving, from a device associated with a camera, a request to perform an action. By way of example, the device may be a mobile phone, a vehicle, television, voice-assistant device, speaker, headset, etc. The device may be associated with one camera or multiple cameras. The one or more cameras may be physical components of the device or the one or more cameras may be separate components from the device and may be in electronic communication with the device, such that the device may control functionality of the one or more cameras. The request to perform an action may be, in examples, any action. However, in some non-limiting examples, the request may correspond to a request to make a monetary transaction, such as, for example, the transfer of money between accounts, the withdrawal of money, the deposit of money, and/or other types of transactions. In general, the action may be any action where identity authentication of the user of the device is required and/or desired.

At block 904, the process 900 may include sending, to the device, an instruction to capture a first image of a user of the device. The remote system may receive data from the device that indicates that the user of the device has requested the action to be performed. The remote system may determine that the requested action is a type of action that requires identity authentication. For example, if the requested action is a request to transfer funds between accounts, the remote system may require that the user of the device be authorized to make such as request. Based at least in part on the determination that the requested action requires identity authentication, the remote system may send data to the device indicating that identity authentication is required. In other examples, certain actions may be predefined as requiring identity authentication and data indicating as much may be stored on the device. In these situations, an indication that identity authentication is required may be presented to the user of the device before the user submits a request to perform the action. As such, the remote system may receive the request to perform the action and data associated with the identity authentication. In examples, the remote system and/or the device may present a request for the user of the device to capture an image of the user using the camera of the device. Based at least in part on the camera capturing the image, the camera may generate corresponding image data. Timing information, location information, camera identity information, device identity information, orientation information, and/or resolution information associated with the image data may also be generated.

At block 906, the process 900 may include causing the camera or another camera associated with the device to capture a second image. Causing the camera to capture a second image may be performed by sending an instruction to the device to cause the camera to capture a second image in response to the first image being captured and/or in response to receiving image data corresponding to the first image. In other examples, the second image may be captured before the first image is captured, such as, for example, in response to the user opening the application, making a selection associated with the application, turning on the device, and/or waking the device. The processes described with respect to block 904 may be performed by a remote system and/or by the device associated with the camera. The second image may be captured within a fraction of a second, a second, and/or multiple seconds of the first image being captured. In examples, upon downloading and/or accessing an application by which the request to perform the action is submitted from, the user of the device may consent to images being captured in the manner described herein. If the user does not consent to such images being captured, other identity authentication verification techniques, as described herein, may be utilized. Second image data corresponding to the second image may be sent to the remote system along with, in examples, timing information, location information, camera identity information, device identity information, orientation information, and/or resolution information associated with the second image.

At block 908, the process 900 may include receiving, from the device, first image data corresponding to the first image. Metadata such as the timing information, location information, camera identity information, device identity information, orientation information, and/or resolution information may also be received. The first image data and/or the metadata may be received utilizing the networks and network interfaces as described herein.

At block 910, the process 900 may include receiving, from the device, second image data corresponding to the second image. Metadata such as the timing information, location information, camera identity information, device identity information, orientation information, and/or resolution information associated with the second image may also be received. The second image data and/or the metadata may be received utilizing the networks and network interfaces as described herein.

At block 912, the process 900 may include refraining from performing the action based at least in part on the first image data matching the second image data. A comparison of the first image data and the second image data may be performed by the remote system. The comparison may include, for example, identifying similarities and/or dissimilarities of one or more aspects between the first image data and the second image data. The aspects of the first image data and/or the second image data may include, for example, colors, positions of colors, presence of items depicted in the images, absence of items from the images, changes in positions of items depicted in the images, facial feature dissimilarities, facial feature similarities, and/or lighting.

Based at least in part on this comparison, it may be determined that the first image and the second image are exactly the same. As used herein, image aspects being exactly the same may correspond to a percentage, or other metric, of the aspects being the same. For example, exactly the same may correspond to 100% similarity, at least 99.9% similarity, at least 99.8% similarity, at least 99.7% similarity, at least 99.6% similarity, at least 99.5% similarity, at least 99.4% similarity, at least 99.3% similarity, at least 99.2% similarity, or at least 99.1% similarity. Based at least in part on the determination that the first image is exactly the same as the second image, it may be determined that the first image is not an authentic photograph of the user of the device.

Refraining from performing the action may include canceling the request to perform the action and/or causing the device to present an indication to the user of the device that the request has been canceled. Additionally, or alternatively, the remote system and/or the device may present a query to the user of the device. The query may request that the user perform an action before the remote system will perform the requested action.

Additionally, or alternatively, the process 900 may include analyzing the location information received from the device. The location information may indicate a location, such as a global positioning location, that the first image was captured at. Location information may also be associated with the second image. In an authorized user situation, the location information associated with the first image will indicate that the first image was captured at or near the location of the second image. In an unauthorized user situation, the location information may indicate that the first image was captured at a different location than the second image. In examples, the determination that the first image was captured at a different location than the second image may be based at least in part on a distance between the two locations being at least a threshold distance. The threshold distance may be static or dynamic. For example, the threshold distance may be set to at least 10 feet, at least 25 feet, at least 50 feet, at least 100 feet, at least 300 feet, at least 0.25 miles, at least 0.5 miles, or at least 1 mile. Additional, or alternative metrics may be used and/or other considerations may be utilized, such as whether the images were captured in different buildings, different cities, different counties, different states and/or territories, and/or different countries. Additionally, or alternatively, the location information may be used in conjunction with the time information and results of facial recognition techniques to determine that two images depicting the same person have been submitted at or near the same time but at different locations.

Additionally, or alternatively, the process 900 may include analyzing the timing information received from the device. Timing information may be associated with the first image. The timing information may indicate a time, such as a time of day and/or a day of the year, that the first image was captured. Timing information may also be associated with the second image. In an authorized user situation, the timing information associated with the first image will indicate that the first image was captured shortly before or after the second image. In an unauthorized user situation, the timing information associated with the first image will indicate that the first image was captured more than a threshold amount of time before or after the second image was captured. This unauthorized user situation may occur when the first image was provided from a camera roll or other image storage and not taken in response to the request for the photograph. Additionally, or alternatively, the timing information may indicate that the first image was sent and/or received more than a threshold amount of time from when the user was presented with the request to capture an image for identity authentication purposes. The threshold amount of time may be, for example, a matter of seconds or a matter of minutes. In this situation, the amount of time between requesting the image and sending and/or receiving the corresponding image data may indicate that the user is attempting to submit an image that is not an authentic image of the user. The remote system may refrain from performing the requested action based at least in part on this analysis.

Additionally, or alternatively, the process 900 may include receiving data from the device indicating that the first image was captured by a camera oriented on a side of the device without a screen. For example, the device may have two cameras, with one camera disposed on a side of the device with a screen or user interface and the other camera disposed on the opposing side, such as a mobile phone. Generally, when a user of the device takes an authentic photograph of him or herself, the camera disposed on the side of the device with the screen is used, which allows the user to see him or herself while the photograph is being taken. To the contrary, when the user of the device is taking a photograph of another person or a picture of a person, the camera on the opposing side of the device is used, again to allow the user of the device to see the other person/picture that he or she is capturing an image of.

Additionally, or alternatively, the process 900 may include analyzing depth-of-field information associated with the first image. For example, depths of various facial features and/or objects to the camera of the device may be determined. In an authorized user situation, the various facial features and/or objects will have varying depths to the camera. However, in some unauthorized user situations, such as when the first image is a picture of an already-taken photograph, the depth information will be the same or substantially the same. This information may be utilized to determine that the first image is not an authentic photograph of the user of the device.

Additionally, or alternatively, the process 900 may include send a query requesting performance of an act while capturing a third image of the user. Sending of the query may be based at least in part on the one or more techniques for verifying identity authentication resulting in the submitted image not being authenticated and/or being authenticated at a low level of confidence. The query may correspond to text data that may displayed on a screen of the device and/or the query may correspond to audio data that may be output via one or more speakers of the device. Based at least in part on the query, a user of the device may perform the requested action. The remote system may receive image data depicting the user performing the requested action. In instances where the remote system determines that the user has performed the action from the query, such as above a threshold confidence level, the remote system may verify that the person depicted in the image is the user of the device. In instances where the remote system determines that the user has not performed the action, and/or when the remote system does not receive a response to the query, the remote system may cancel the requested action and/or may present one or more additional and/or different queries for the user to perform.

Additionally, or alternatively, the process 900 may include analyzing resolution data associated with the first image and determining that the person depicted in the image is or is not the user of the device based at least in part on the resolution data. The techniques may include comparing image resolutions of the first image and the second image, and/or comparing an image resolution of the first image with a reference resolution associated with the camera from which the first image was received. For example, in an authorized user situation, the first image and the second image will be captured by the same camera, and that camera will be associated with the device that the corresponding image data is received from. If the resolution of the first image is the same or substantially the same as the resolution of the second image, then this information may be utilized to determine that the first image is an authentic photograph of the user of the device. Additionally, or alternatively, if the resolution of the first image matches or substantially matches a reference resolution associated with the device from which the first image data was received from, it may be determined that the first image is an authentic photograph of the user of the device. To the contrary, if the resolution associated with the first image differs from the resolution associated with the second image, and/or if the resolution associated with the first image differs from a reference resolution associated with the device, then it may be determined that the first image is not an authentic photograph of the user of the device The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system comprising:
one or more processors; and
non-transitory computer-readable media storing instructions that, when executed by the one or more processors, cause the one or more processors to perform operations comprising:
receiving, from a device associated with a camera, a request to perform an action;
sending, to the device, a request to capture a first image of a user of the device, the request causing the camera to capture a second image in response to the first image being captured;
receiving, from the device, first image data corresponding to the first image and first location information associated with the first image, the first location information indicating a first location at which the first image was captured;
receiving, from the device, second image data corresponding to the second image and second location information associated with the second image, the second location information indicating a second location at which the second image was captured;
determining, based at least in part on a comparison of the first image data and the second image data, that first aspects of the first image data are substantially similar to second aspects of the second image data;
determining that the first location is within a threshold distance of the second location; and
performing the action based at least in part on the first aspects being substantially similar to the second aspects and the first location being within the threshold distance of the second location.

2. The system of claim 1, the operations further comprising:
receiving first time information associated with the first image, the first time information indicating a first time at which the first image was captured;
receiving second time information associated with the second image, the second time information indicating a second time at which the second image was captured;
determining that the first time is within a threshold amount of time from the second time; and
wherein performing the action is based at least in part on the first time being within a threshold amount of time from the second time.

3. The system of claim 1, the operations further comprising:
determining that a position of at least a portion of an object depicted in the first image has changed in the second image;
determining, based at least in part on the position of the at least the portion of the object changing, that the at least the portion of the object is in motion; and
wherein performing the action is based at least in part on determining that the at least the portion of the object is in motion.

4. The system of claim 1, wherein the device comprises a first device associated with a profile, and the operations further comprising:
determining that the first device is in electronic communication with a second device associated with the profile; and wherein performing the action is based at least in part on determining that the first device is in electronic communication with the second device.

5. The system of claim 1, wherein the camera comprises a first camera of multiple cameras associated with the device, the first camera being disposed on a side of the device that includes a screen, the operations further comprising:
receiving data indicating that the first image was captured by the first camera; and
wherein performing the action is based at least in part on the data.

6. The system of claim 1, the operations further comprising:
receiving depth-of-field data associated with the first image;
determining that the depth-of-field data is substantially similar to reference data associated with capturing images by the camera of the device; and
wherein performing the action is based at least in part on determining the depth-of-field data is substantially similar to the reference data.

7. The system of claim 1, the operations further comprising:
receiving first resolution data associated with the first image data;
receiving second resolution data associated with the second image data;
determining that the first resolution data is substantially similar to the second resolution data; and
wherein performing the action is based at least in part on determining the first resolution data is substantially similar to the second resolution data.

8. A method comprising:
receiving, from a device associated with a camera, a request to perform an action;
sending, to the device, a notification to capture a first image of a user of the device;
receiving, from the device, first image data corresponding to the first image and depth-of-field data associated with the first image;
determining that the depth-of-field data is substantially similar to reference depth-of-field data associated with capturing images by the camera of the device; and
performing the action based at least in part on the depth-of-field data being substantially similar to the reference depth-of-field data.

9. The method of claim 8, wherein the image comprises a first image, the image data comprises first image data, and the method further comprises:
receiving first location information associated with the first image, the first location information indicating a first location at which the first image was captured;
determining, from the first image data and based at least in part on facial recognition techniques, first characteristics of a person depicted in the first image;
determining that the first characteristics are substantially similar to second characteristics recognized with respect to a second image;
receiving second location information associated with the second image, the second location information indicating a second location at which the second image was captured;
determining that the first location is within a threshold distance from the second location; and
wherein performing the action is based at least in part on the first location being within the threshold distance from the second location.

10. The method of claim 8, wherein the image data comprises first image data, and the method further comprises:
determining a period of time between receiving the first image data and receiving second image data from the device;
determining that the period of time is less than a threshold period of time; and
wherein performing the action is based at least in part on the period of time being less than the threshold period of time.

11. The method of 7, further comprising:
receiving information indicating an orientation of the device at a time when the image was captured;
determining that the orientation corresponds to a reference orientation associated with capturing images by the camera of the device; and
wherein performing the action is based at least in part on the orientation corresponding to the reference orientation.

12. A system comprising:
one or more processors; and
non-transitory computer-readable media including instructions that, when executed by the one or more processors, causes the one or more processors to perform operations comprising:
receiving, from a device associated with a camera, a request to perform an action;
sending, to the device, a notification to capture a first image of a user of the device;
causing the camera to capture a second image;
receiving, from the device, first image data corresponding to the first image and first resolution data associated with the first image data;
receiving, from the device, second image data corresponding to the second image and second resolution data associated with the second image data;
determining that the first resolution data differs from the second resolution data; and
refraining from performing the action based at least in part on the first resolution data differing from the second resolution data.

13. The system of claim 12, the operations further comprising:
receiving first location information associated with the first image, the first location information indicating a first location at which the first image was captured;
receiving second location information associated with the second image, the second location information indicating a second location at which the second image was captured;
determining that the first location is at least a threshold distance away from the second location; and
wherein refraining from performing the action is based at least in part on the first location being at least the threshold distance away from the second location.

14. The system of claim 12, the operations further comprising:
receiving first time information associated with the first image, the first time information indicating a first time at which the first image was captured;
receiving second time information associated with the second image, the second time information indicating a second time at which the second image was captured;

determining that an amount of time between the first time and the second time is at least a threshold amount of time; and wherein refraining from performing the action is based at least in part on the amount of time being at least the threshold amount of time.

15. The system of claim 12, wherein the camera comprises a first camera oriented on a first side of the device that includes a screen, the operations further comprising:

receiving data indicating that the first image was captured by a second camera oriented on a second side of the device without the screen; and wherein refraining from performing the action is based at least in part on the data.

16. The system of claim 12, the operations further comprising:

performing facial recognition techniques on the second image data;

determining, based at least in part on the facial recognition techniques, that facial characteristics of a person depicted in the second image differ from reference facial characteristics associated with one or more authorized users of the device; and wherein refraining from performing the action is based at least in part on the facial characteristics differing from the reference facial characteristics.

17. The system of claim 12, the operations further comprising:

receiving depth-of-field data associated with the first image;

determining that the depth-of-field data differs from reference data associated with capturing images by the camera of the device; and wherein refraining from performing the action is based at least in part on the depth-of-field data differing from the reference data.

18. The system of claim 12, the operations further comprising:

sending, to the device and based at least in part on determining that the first image does not depict the user, a query, the query requesting the performance of an act while capturing a third image of the user;

determining, from third image data corresponding to the third image, that the act was performed; and performing the action based at least in part on determining that the act was performed.

* * * * *